(12) United States Patent
el Kaliouby et al.

(10) Patent No.: US 10,628,741 B2
(45) Date of Patent: Apr. 21, 2020

(54) MULTIMODAL MACHINE LEARNING FOR EMOTION METRICS

(71) Applicant: Affectiva, Inc., Boston, MA (US)

(72) Inventors: Rana el Kaliouby, Milton, MA (US); Seyedmohammad Mavadati, Watertown, MA (US); Taniya Mishra, New York, NY (US); Timothy Peacock, Concord, MA (US); Panu James Turcot, Pacifica, CA (US)

(73) Assignee: Affectiva, Inc., Boston, MA (US)

( * ) Notice: Subject to any disclaimer, the term of this patent is extended or adjusted under 35 U.S.C. 154(b) by 0 days.

(21) Appl. No.: 16/127,618

(22) Filed: Sep. 11, 2018

(65) Prior Publication Data

US 2019/0012599 A1 Jan. 10, 2019

Related U.S. Application Data

(63) Continuation-in-part of application No. 15/861,855, filed on Jan. 4, 2018, now Pat. No. 10,204,625, which
(Continued)

(51) Int. Cl.
*G06N 3/08* (2006.01)
*G06K 9/00* (2006.01)
(Continued)

(52) U.S. Cl.
CPC ......... *G06N 3/084* (2013.01); *G06K 9/00302* (2013.01); *G06K 9/6288* (2013.01);
(Continued)

(58) Field of Classification Search
None
See application file for complete search history.

(56) References Cited

U.S. PATENT DOCUMENTS 3,034,500 A 5/1962 Backster, Jr.
3,548,806 A 12/1970 Fisher
(Continued)

FOREIGN PATENT DOCUMENTS

JP 08115367 7/1996
KR 10-2005-0021759 A 3/2005
(Continued)

OTHER PUBLICATIONS

Rana Ayman El Kaliouby, Mind-reading machines: automated inference of complex mental states, Jul. 2005, University of Cambridge, Cambridge, United Kingdom.
(Continued)

*Primary Examiner* — Thomas S McCormack
(74) *Attorney, Agent, or Firm* — Adams Intellex, PLC

(57) ABSTRACT

Techniques are described for machine-trained analysis for multimodal machine learning. A computing device captures a plurality of information channels, wherein the plurality of information channels includes contemporaneous audio information and video information from an individual. A multilayered convolutional computing system learns trained weights using the audio information and the video information from the plurality of information channels, wherein the trained weights cover both the audio information and the video information and are trained simultaneously, and wherein the learning facilitates emotional analysis of the audio information and the video information. A second computing device captures further information and analyzes the further information using trained weights to provide an emotion metric based on the further information. Additional information is collected with the plurality of information channels from a second individual and learning the trained weights factors in the additional information. The further information can include only video data or audio data.

24 Claims, 13 Drawing Sheets

Related U.S. Application Data is a continuation-in-part of application No. 15/670,791, filed on Aug. 7, 2017, now Pat. No. 10,074,024, which is a continuation-in-part of application No. 15/660,048, filed on Aug. 1, 2017, which is a continuation-in-part of application No. 15/395,750, filed on Dec. 30, 2016, which is a continuation-in-part of application No. 15/262,197, filed on Sep. 12, 2016, now abandoned, which is a continuation-in-part of application No. 14/796,419, filed on Jul. 10, 2015, now abandoned, which is a continuation-in-part of application No. 14/460,915, filed on Aug. 15, 2014, said application No. 15/670,791 is a continuation-in-part of application No. 14/214,918, filed on Mar. 15, 2014, now Pat. No. 9,723,992, which is a continuation-in-part of application No. 13/153,745, filed on Jun. 6, 2011, now abandoned, said application No. 14/460,915 is a continuation-in-part of application No. 13/153,745.

(60) Provisional application No. 62/679,825, filed on Jun. 3, 2018, provisional application No. 62/637,567, filed on Mar. 2, 2018, provisional application No. 62/625,274, filed on Feb. 1, 2018, provisional application No. 62/611,780, filed on Dec. 29, 2017, provisional application No. 62/593,440, filed on Dec. 1, 2017, provisional application No. 62/593,449, filed on Dec. 1, 2017, provisional application No. 62/557,460, filed on Sep. 12, 2017, provisional application No. 62/541,847, filed on Aug. 7, 2017, provisional application No. 62/524,606, filed on Jun. 25, 2017, provisional application No. 62/503,485, filed on May 9, 2017, provisional application No. 62/469,591, filed on Mar. 10, 2017, provisional application No. 62/448,448, filed on Jan. 20, 2017, provisional application No. 62/442,325, filed on Jan. 4, 2017, provisional application No. 62/442,291, filed on Jan. 4, 2017, provisional application No. 62/439,928, filed on Dec. 29, 2016, provisional application No. 62/370,421, filed on Aug. 3, 2016, provisional application No. 62/301,558, filed on Feb. 29, 2016, provisional application No. 62/273,896, filed on Dec. 31, 2015, provisional application No. 62/265,937, filed on Dec. 10, 2015, provisional application No. 62/222,518, filed on Sep. 23, 2015, provisional application No. 62/217,872, filed on Sep. 12, 2015, provisional application No. 62/128,974, filed on Mar. 5, 2015, provisional application No. 62/082,579, filed on Nov. 20, 2014, provisional application No. 62/047,508, filed on Sep. 8, 2014, provisional application No. 62/023,800, filed on Jul. 11, 2014, provisional application No. 61/972,314, filed on Mar. 30, 2014, provisional application No. 61/953,878, filed on Mar. 16, 2014, provisional application No. 61/927,481, filed on Jan. 15, 2014, provisional application No. 61/924,252, filed on Jan. 7, 2014, provisional application No. 61/916,190, filed on Dec. 14, 2013, provisional application No. 61/867,007, filed on Aug. 16, 2013, provisional application No. 61/844,478, filed on Jul. 10, 2013, provisional application No. 61/793,761, filed on Mar. 15, 2013, provisional application No. 61/789,038, filed on Mar. 15, 2013, provisional application No. 61/798,731, filed on Mar. 15, 2013, provisional application No. 61/790,461, filed on Mar. 15, 2013, provisional application No. 61/467,209, filed on Mar. 24, 2011, provisional application No. 61/447,464, filed on Feb. 28, 2011, provisional application No. 61/447,089, filed on Feb. 27, 2011, provisional application No. 61/439,913, filed on Feb. 6, 2011, provisional application No. 61/414,451, filed on Nov. 17, 2010, provisional application No. 61/388,002, filed on Sep. 30, 2010, provisional application No. 61/352,166, filed on Jun. 7, 2010.

(51) Int. Cl.
*G06N 3/04* (2006.01)
*G06K 9/62* (2006.01)
*G10L 25/63* (2013.01)
*G10L 21/0356* (2013.01)
*G10L 25/30* (2013.01)
*G06N 20/10* (2019.01)

(52) U.S. Cl.
CPC ............. *G06N 3/04* (2013.01); *G06N 3/0454* (2013.01); *G06N 3/0472* (2013.01); *G06N 3/0481* (2013.01); *G06N 20/10* (2019.01); *G10L 21/0356* (2013.01); *G10L 25/30* (2013.01); *G10L 25/63* (2013.01)

(56) References Cited

U.S. PATENT DOCUMENTS

| | | |
|---|---|---|
| 3,870,034 A | 3/1975 | James |
| 4,353,375 A | 10/1982 | Colburn et al. |
| 4,448,203 A | 5/1984 | Williamson et al. |
| 4,794,533 A | 12/1988 | Cohen |
| 4,807,642 A | 2/1989 | Brown |
| 4,817,628 A | 4/1989 | Zealear et al. |
| 4,950,069 A | 8/1990 | Hutchinson |
| 4,964,411 A | 10/1990 | Johnson et al. |
| 5,016,282 A | 5/1991 | Tomono et al. |
| 5,031,228 A | 7/1991 | Lu |
| 5,219,322 A | 6/1993 | Weathers |
| 5,247,938 A | 9/1993 | Silverstein et al. |
| 5,259,390 A | 11/1993 | Maclean |
| 5,507,291 A | 4/1996 | Stirbl et al. |
| 5,572,596 A | 11/1996 | Wildes et al. |
| 5,619,571 A | 4/1997 | Sandstorm et al. |
| 5,647,834 A | 7/1997 | Ron |
| 5,649,061 A | 7/1997 | Smyth |
| 5,663,900 A | 9/1997 | Bhandari et al. |
| 5,666,215 A | 9/1997 | Fredlund et al. |
| 5,725,472 A | 3/1998 | Weathers |
| 5,741,217 A | 4/1998 | Gero |
| 5,760,917 A | 6/1998 | Sheridan |
| 5,762,611 A | 6/1998 | Lewis et al. |
| 5,772,508 A | 6/1998 | Sugita et al. |
| 5,772,591 A | 6/1998 | Cram |
| 5,774,591 A | 6/1998 | Black et al. |
| 5,802,220 A | 9/1998 | Black et al. |
| 5,825,355 A | 10/1998 | Palmer et al. |
| 5,886,683 A | 3/1999 | Tognazzini et al. |
| 5,898,423 A | 4/1999 | Tognazzini et al. |
| 5,920,477 A | 7/1999 | Hoffberg et al. |
| 5,945,988 A | 8/1999 | Williams et al. |
| 5,959,621 A | 9/1999 | Nawaz et al. |
| 5,969,755 A | 10/1999 | Courtney |
| 5,983,129 A | 11/1999 | Cowan et al. |
| 5,987,415 A | 11/1999 | Breese et al. |
| 6,004,061 A | 12/1999 | Manico et al. |
| 6,004,312 A | 12/1999 | Finneran et al. |
| 6,008,817 A | 12/1999 | Gilmore, Jr. |
| 6,026,321 A | 2/2000 | Miyata et al. |
| 6,026,322 A | 2/2000 | Korenman et al. |
| 6,056,781 A | 5/2000 | Wassick et al. |
| 6,067,565 A | 5/2000 | Horvitz |
| 6,088,040 A | 7/2000 | Oda et al. |
| 6,091,334 A | 7/2000 | Galiana et al. |

(56) References Cited

U.S. PATENT DOCUMENTS

| | | |
|---|---|---|
| 6,099,319 A | 8/2000 | Zaltman et al. |
| 6,134,644 A | 10/2000 | Mayuzumi et al. |
| 6,182,098 B1 | 1/2001 | Selker |
| 6,185,534 B1 | 2/2001 | Breese et al. |
| 6,195,651 B1 | 2/2001 | Handel et al. |
| 6,212,502 B1 | 4/2001 | Ballet et al. |
| 6,222,607 B1 | 4/2001 | Szajewski et al. |
| 6,309,342 B1 | 10/2001 | Blazey et al. |
| 6,327,580 B1 | 12/2001 | Pierce et al. |
| 6,349,290 B1 | 2/2002 | Horowitz et al. |
| 6,351,273 B1 | 2/2002 | Lemelson et al. |
| 6,437,758 B1 | 8/2002 | Nielsen et al. |
| 6,443,840 B2 | 9/2002 | Von Kohorn |
| 6,530,082 B1 | 3/2003 | Del Sesto et al. |
| 6,577,329 B1 | 6/2003 | Flickner et al. |
| 6,606,102 B1 | 8/2003 | Odom |
| 6,629,104 B1 | 9/2003 | Parulski et al. |
| 6,792,458 B1 | 9/2004 | Muret et al. |
| 6,847,376 B2 | 1/2005 | Engeldrum et al. |
| 7,003,135 B2 | 2/2006 | Hsieh et al. |
| 7,013,478 B1 | 3/2006 | Hendricks et al. |
| 7,113,916 B1 | 9/2006 | Hill |
| 7,120,880 B1 | 10/2006 | Dryer et al. |
| 7,197,459 B1 | 3/2007 | Harinarayan et al. |
| 7,233,684 B2 | 6/2007 | Fedorovskaya et al. |
| 7,246,081 B2 | 7/2007 | Hill |
| 7,263,474 B2 | 8/2007 | Fables et al. |
| 7,266,582 B2 | 9/2007 | Stelting |
| 7,307,636 B2 | 12/2007 | Matraszek et al. |
| 7,319,779 B1 | 1/2008 | Mummareddy et al. |
| 7,327,505 B2 | 2/2008 | Fedorovskaya et al. |
| 7,350,138 B1 | 3/2008 | Swaminathan et al. |
| 7,353,399 B2 | 4/2008 | Doi et al. |
| 7,355,627 B2 | 4/2008 | Yamazaki et al. |
| 7,428,318 B1 | 9/2008 | Madsen et al. |
| 7,474,801 B2 | 1/2009 | Teo et al. |
| 7,496,622 B2 | 2/2009 | Brown et al. |
| 7,549,161 B2 | 6/2009 | Poo et al. |
| 7,551,755 B1 | 6/2009 | Steinberg et al. |
| 7,555,148 B1 | 6/2009 | Steinberg et al. |
| 7,558,408 B1 | 7/2009 | Steinberg et al. |
| 7,564,994 B1 | 7/2009 | Steinberg et al. |
| 7,573,439 B2 | 8/2009 | Lau et al. |
| 7,580,512 B2 | 8/2009 | Batni et al. |
| 7,584,435 B2 | 9/2009 | Bailey et al. |
| 7,587,068 B1 | 9/2009 | Steinberg et al. |
| 7,610,289 B2 | 10/2009 | Muret et al. |
| 7,620,934 B2 | 11/2009 | Falter et al. |
| 7,644,375 B1 | 1/2010 | Anderson et al. |
| 7,676,574 B2 | 3/2010 | Glommen et al. |
| 7,757,171 B1 | 7/2010 | Wong et al. |
| 7,826,657 B2 | 11/2010 | Zhang et al. |
| 7,830,570 B2 | 11/2010 | Morita et al. |
| 7,881,493 B1 | 2/2011 | Edwards et al. |
| 7,921,036 B1 | 4/2011 | Sharma |
| 8,010,458 B2 | 8/2011 | Galbreath et al. |
| 8,022,831 B1 | 9/2011 | Wood-Eyre |
| 8,219,438 B1 | 7/2012 | Moon et al. |
| 8,401,248 B1 | 3/2013 | Moon et al. |
| 8,442,638 B2 | 5/2013 | Libbus et al. |
| 8,522,779 B2 | 9/2013 | Lee et al. |
| 8,600,120 B2 | 12/2013 | Gonion et al. |
| 8,640,021 B2 | 1/2014 | Perez et al. |
| 2001/0033286 A1 | 10/2001 | Stokes et al. |
| 2001/0041021 A1 | 11/2001 | Boyle et al. |
| 2002/0007249 A1 | 1/2002 | Cranley |
| 2002/0030665 A1 | 3/2002 | Ano |
| 2002/0042557 A1 | 4/2002 | Bensen et al. |
| 2002/0054174 A1 | 5/2002 | Abbott et al. |
| 2002/0084902 A1 | 7/2002 | Zadrozny et al. |
| 2002/0171551 A1 | 11/2002 | Eshelman |
| 2002/0182574 A1 | 12/2002 | Freer |
| 2003/0035567 A1 | 2/2003 | Chang et al. |
| 2003/0037041 A1 | 2/2003 | Hertz |
| 2003/0060728 A1 | 3/2003 | Mandigo |
| 2003/0093784 A1 | 5/2003 | Dimitrova et al. |
| 2003/0182123 A1 | 9/2003 | Mitsuyoshi |
| 2003/0191682 A1 | 10/2003 | Shepard et al. |
| 2003/0191816 A1 | 10/2003 | Landress et al. |
| 2004/0181457 A1 | 9/2004 | Biebesheimer |
| 2005/0187437 A1 | 8/2005 | Matsugu |
| 2005/0283055 A1 | 12/2005 | Shirai et al. |
| 2005/0289582 A1 | 12/2005 | Tavares et al. |
| 2006/0019224 A1 | 1/2006 | Behar et al. |
| 2006/0143647 A1 | 6/2006 | Bill |
| 2006/0170945 A1 | 8/2006 | Bill |
| 2006/0235753 A1 | 10/2006 | Kameyama |
| 2007/0167689 A1 | 7/2007 | Ramadas et al. |
| 2007/0173733 A1 | 7/2007 | Le et al. |
| 2007/0239787 A1 | 10/2007 | Cunningham et al. |
| 2007/0255831 A1 | 11/2007 | Hayashi et al. |
| 2007/0265507 A1 | 11/2007 | de Lemos |
| 2007/0299964 A1 | 12/2007 | Wong et al. |
| 2008/0059570 A1 | 3/2008 | Bill |
| 2008/0091512 A1 | 4/2008 | Marci et al. |
| 2008/0091515 A1 | 4/2008 | Thieberger et al. |
| 2008/0101660 A1 | 5/2008 | Seo |
| 2008/0103784 A1 | 5/2008 | Wong et al. |
| 2008/0184170 A1 | 7/2008 | Periyalwar |
| 2008/0201144 A1* | 8/2008 | Song ............... G06K 9/00281 704/236 |
| 2008/0208015 A1 | 8/2008 | Morris et al. |
| 2008/0221472 A1 | 9/2008 | Lee et al. |
| 2008/0287821 A1 | 11/2008 | Jung et al. |
| 2008/0292151 A1 | 11/2008 | Kurtz et al. |
| 2009/0002178 A1 | 1/2009 | Guday et al. |
| 2009/0006206 A1 | 1/2009 | Groe |
| 2009/0083421 A1 | 3/2009 | Glommen et al. |
| 2009/0094286 A1 | 4/2009 | Lee et al. |
| 2009/0112694 A1 | 4/2009 | Jung et al. |
| 2009/0112810 A1 | 4/2009 | Jung et al. |
| 2009/0133048 A1 | 5/2009 | Gibbs et al. |
| 2009/0150919 A1 | 6/2009 | Lee et al. |
| 2009/0156907 A1 | 6/2009 | Jung et al. |
| 2009/0164132 A1 | 6/2009 | Jung et al. |
| 2009/0193344 A1 | 7/2009 | Smyers |
| 2009/0210290 A1 | 8/2009 | Elliott et al. |
| 2009/0217315 A1 | 8/2009 | Malik et al. |
| 2009/0259518 A1 | 10/2009 | Harvey |
| 2009/0270170 A1 | 10/2009 | Patton |
| 2009/0271417 A1 | 10/2009 | Toebes et al. |
| 2009/0299840 A1 | 12/2009 | Smith |
| 2010/0070523 A1 | 3/2010 | Delgo et al. |
| 2010/0086215 A1 | 4/2010 | Bartlett et al. |
| 2010/0099955 A1 | 4/2010 | Thomas et al. |
| 2010/0266213 A1 | 10/2010 | Hill |
| 2010/0274847 A1 | 10/2010 | Anderson et al. |
| 2010/0324437 A1 | 12/2010 | Freeman |
| 2011/0007174 A1 | 1/2011 | Bacivarov et al. |
| 2011/0126226 A1 | 5/2011 | Makhlouf |
| 2011/0134026 A1 | 6/2011 | Kang et al. |
| 2011/0143728 A1 | 6/2011 | Holopainen et al. |
| 2011/0144971 A1 | 6/2011 | Danielson |
| 2011/0196855 A1 | 8/2011 | Wable et al. |
| 2011/0218950 A1* | 9/2011 | Mirowski ............ A61B 5/0476 706/12 |
| 2011/0231240 A1 | 9/2011 | Schoen et al. |
| 2011/0251493 A1 | 10/2011 | Poh et al. |
| 2011/0263946 A1 | 10/2011 | el Kaliouby et al. |
| 2012/0324491 A1 | 12/2012 | Bathiche et al. |
| 2013/0023337 A1 | 1/2013 | Bowers et al. |
| 2013/0116587 A1 | 5/2013 | Sommo et al. |
| 2013/0197409 A1 | 8/2013 | Baxter et al. |
| 2013/0337421 A1* | 12/2013 | Gerken, III ............... G09B 5/00 434/236 |
| 2014/0172910 A1 | 6/2014 | Jung et al. |
| 2016/0104486 A1 | 4/2016 | Pendia et al. |
| 2017/0003784 A1 | 1/2017 | Garg et al. |

FOREIGN PATENT DOCUMENTS

| | | |
|---|---|---|
| KR | 10-2008-0016303 A | 2/2008 |
| KR | 1020100048688 A | 5/2010 |
| WO | WO 2011/045422 A1 | 4/2011 |

(56) References Cited

FOREIGN PATENT DOCUMENTS

OTHER PUBLICATIONS

International Search Report dated Nov. 14, 2011 for PCT/US2011/39282.
International Search Report dated Apr. 16, 2012 for PCT/US2011/054125.
International Search Report dated May 24, 2012 for PCT/US2011/060900.
Xiaoyu Wang, An HOG-LBP human detector with partial occlusion handling, Sep. 29, 2009, IEEE 12th International Conference on Computer Vision, Kyoto, Japan.
Zhong Zeng, A Survey of Affect Recognition Methods: Audio, Visual, and Spontaneous Expressions, Jan. 2009, IEEE Transactions on Pattern Analysis and Machine Intelligence, vol. 31, No. 1.
Nicholas R. Howe and Amanda Ricketson, Improving the Boosted Correlogram, 2004, Lecture Notes in Computer Science, ISSN 0302-9743, Springer-Verlag, Germany.
Xuming HE, et al, Learning and Incorporating Top-Down Cues in Image Segmentation, 2006, Lecture Notes in Computer Science, ISBN 978-3-540-33832-1, Springer-Verlag, Germany.
Ross Eaton, et al, Rapid Training of Image Classifiers through Adaptive, Multi-frame Sampling Methods, Oct. 2008, IEEE 37th Applied Imagery Pattern Recognition Workshop, Washington DC.
Verkruysse, Wim, Lars O. Svaasand, and J. Stuart Nelson. "Remote plethysmographic imaging using ambient light." Optics express 16.26 (2008): 21434-21445.
Albiol, Alberto, et al. "Face recognition using HOG-EBGM." Pattern Recognition Letters 29.10 (2008): 1537-1543.

* cited by examiner

MULTIMODAL MACHINE LEARNING FOR EMOTION METRICS

RELATED APPLICATIONS

This application claims the benefit of U.S. provisional patent applications "Multimodal Machine Learning for Emotion Metrics" Ser. No. 62/557,460, filed Sep. 12, 2017, "Speech Analysis for Cross-Language Mental State Identification" Ser. No. 62/593,449, filed Dec. 1, 2017, "Avatar Image Animation using Translation Vectors" Ser. No. 62/593,440, filed Dec. 1, 2017, "Directed Control Transfer for Autonomous Vehicles" Ser. No. 62/611,780, filed Dec. 29, 2017, "Cognitive State Vehicle Navigation Based on Image Processing" Ser. No. 62/625,274, filed Feb. 1, 2018, "Cognitive State Based Vehicle Manipulation Using Near Infrared Image Processing" Ser. No. 62/637,567, filed Mar. 2, 2018, and "Vehicle Manipulation Using Cognitive State" Ser. No. 62/679,825, filed Jun. 3, 2018.

This application is also a continuation-in-part of "Audio Analysis Learning using Video Data" Ser. No. 15/861,855, filed Jan. 4, 2018, which claims the benefit of U.S. provisional patent applications "Audio Analysis Learning using Video Data" Ser. No. 62/442,325, filed Jan. 4, 2017, "Smart Toy Interaction using Image Analysis" Ser. No. 62/442,291, filed Jan. 4, 2017, "Vehicle Manipulation using Occupant Image Analysis" Ser. No. 62/448,448, filed Jan. 20, 2017, "Image Analysis for Two-sided Data Hub" Ser. No. 62/469,591, filed Mar. 10, 2017, "Vehicle Artificial Intelligence Evaluation of Mental States" Ser. No. 62/503,485, filed May 9, 2017, "Image Analysis for Emotional Metric Generation" Ser. No. 62/524,606, filed Jun. 25, 2017, "Image Analysis and Representation for Emotional Metric Threshold Evaluation" Ser. No. 62/541,847, filed Aug. 7, 2017, "Multimodal Machine Learning for Emotion Metrics" Ser. No. 62/557,460, filed Sep. 12, 2017, "Speech Analysis for Cross-Language Mental State Identification" Ser. No. 62/593,449, filed Dec. 1, 2017, "Avatar Image Animation using Translation Vectors" Ser. No. 62/593,440, filed Dec. 1, 2017, and "Directed Control Transfer for Autonomous Vehicles" Ser. No. 62/611,780, filed Dec. 29, 2017.

The patent application "Audio Analysis Learning using Video Data" Ser. No. 15/861,855, filed Jan. 4, 2018 is also a continuation-in-part of U.S. patent application "Mental State Analysis Using Blink Rate for Vehicles" Ser. No. 15/670,791, filed Aug. 7, 2017, which claims the benefit of U.S. provisional patent applications "Image Analysis Framework using Remote Learning with Deployable Artifact" Ser. No. 62/439,928, filed Dec. 29, 2016, "Audio Analysis Learning using Video Data" Ser. No. 62/442,325, filed Jan. 4, 2017, "Vehicle Manipulation using Occupant Image Analysis" Ser. No. 62/448,448, filed Jan. 20, 2017, "Smart Toy Interaction using Image Analysis" Ser. No. 62/442,291, filed Jan. 4, 2017, "Image Analysis for Two-sided Data Hub" Ser. No. 62/469,591, filed Mar. 10, 2017, "Vehicle Artificial Intelligence Evaluation of Mental States" Ser. No. 62/503,485, filed May 9, 2017, and "Image Analysis for Emotional Metric Generation" Ser. No. 62/524,606, filed Jun. 25, 2017.

The patent application "Mental State Analysis Using Blink Rate for Vehicles" Ser. No. 15/670,791, filed Aug. 7, 2017 is also continuation-in-part of U.S. patent application "Mental State Analysis Using Blink Rate" Ser. No. 14/214,918, filed Mar. 15, 2014, which claims the benefit of U.S. provisional patent applications "Mental State Analysis Using Blink Rate" Ser. No. 61/789,038, filed Mar. 15, 2013, "Mental State Analysis Using Heart Rate Collection Based on Video Imagery" Ser. No. 61/793,761, filed Mar. 15, 2013, "Mental State Data Tagging for Data Collected from Multiple Sources" Ser. No. 61/790,461, filed Mar. 15, 2013, "Mental State Well Being Monitoring" Ser. No. 61/798,731, filed Mar. 15, 2013, "Personal Emotional Profile Generation" Ser. No. 61/844,478, filed Jul. 10, 2013, "Heart Rate Variability Evaluation for Mental State Analysis" Ser. No. 61/916,190, filed Dec. 14, 2013, "Mental State Analysis Using an Application Programming Interface" Ser. No. 61/924,252, filed Jan. 7, 2014, and "Mental State Analysis for Norm Generation" Ser. No. 61/927,481, filed Jan. 15, 2014.

The patent application "Mental State Analysis Using Blink Rate" Ser. No. 14/214,918, filed Mar. 15, 2014, is also a continuation-in-part of U.S. patent application "Mental State Analysis Using Web Services" Ser. No. 13/153,745, filed Jun. 6, 2011, which claims the benefit of U.S. provisional patent applications "Mental State Analysis Through Web Based Indexing" Ser. No. 61/352,166, filed Jun. 7, 2010, "Measuring Affective Data for Web-Enabled Applications" Ser. No. 61/388,002, filed Sep. 30, 2010, "Sharing Affect Data Across a Social Network" Ser. No. 61/414,451, filed Nov. 17, 2010, "Using Affect Within a Gaming Context" Ser. No. 61/439,913, filed Feb. 6, 2011, "Recommendation and Visualization of Affect Responses to Videos" Ser. No. 61/447,089, filed Feb. 27, 2011, "Video Ranking Based on Affect" Ser. No. 61/447,464, filed Feb. 28, 2011, and "Baseline Face Analysis" Ser. No. 61/467,209, filed Mar. 24, 2011.

The patent application "Mental State Analysis Using Blink Rate for Vehicles" Ser. No. 15/670,791, filed Aug. 7, 2017 is also a continuation-in-part of U.S. patent application "Computer Based Convolutional Processing for Image Analysis" Ser. No. 15/666,048, filed Aug. 1, 2017, which claims the benefit of U.S. provisional patent applications "Deep Convolutional Neural Network Analysis of Images for Mental States" Ser. No. 62/370,421, filed Aug. 3, 2016, "Image Analysis Framework using Remote Learning with Deployable Artifact" Ser. No. 62/439,928, filed Dec. 29, 2016, "Audio Analysis Learning using Video Data" Ser. No. 62/442,325, filed Jan. 4, 2017, "Vehicle Manipulation using Occupant Image Analysis" Ser. No. 62/448,448, filed Jan. 20, 2017, "Smart Toy Interaction using Image Analysis" Ser. No. 62/442,291, filed Jan. 4, 2017, "Image Analysis for Two-sided Data Hub" Ser. No. 62/469,591, filed Mar. 10, 2017, "Vehicle Artificial Intelligence Evaluation of Mental States" Ser. No. 62/503,485, filed May 9, 2017, and "Image Analysis for Emotional Metric Generation" Ser. No. 62/524,606, filed Jun. 25, 2017.

The patent application "Computer Based Convolutional Processing for Image Analysis" Ser. No. 15/666,048, filed Aug. 1, 2017 is also a continuation-in-part of U.S. patent application "Image Analysis using Sub-sectional Component Evaluation to Augment Classifier Usage" Ser. No. 15/395,750, filed Dec. 30, 2016, which claims the benefit of U.S. provisional patent applications "Image Analysis Using Sub-Sectional Component Evaluation to Augment Classifier Usage" Ser. No. 62/273,896, filed Dec. 31, 2015, "Analytics for Live Streaming Based on Image Analysis within a Shared Digital Environment" Ser. No. 62/301,558, filed Feb. 29, 2016, and "Deep Convolutional Neural Network Analysis of Images for Mental States" Ser. No. 62/370,421, filed Aug. 3, 2016.

The patent application "Image Analysis using Sub-sectional Component Evaluation to Augment Classifier Usage" Ser. No. 15/395,750, filed Dec. 30, 2016, is also a continuation-in-part of U.S. patent application "Mental State Event Signature Usage" Ser. No. 15/262,197, filed Sep. 12, 2016, which claims the benefit of U.S. provisional patent applications "Mental State Event Signature Usage" Ser. No. 62/217,872, filed Sep. 12, 2015, "Image Analysis In Support of Robotic Manipulation" Ser. No. 62/222,518, filed Sep. 23, 2015, "Analysis of Image Content with Associated Manipulation of Expression Presentation" Ser. No. 62/265,937, filed Dec. 10, 2015, "Image Analysis Using Sub-Sectional Component Evaluation To Augment Classifier Usage" Ser. No. 62/273,896, filed Dec. 31, 2015, "Analytics for Live Streaming Based on Image Analysis within a Shared Digital Environment" Ser. No. 62/301,558, filed Feb. 29, 2016, and "Deep Convolutional Neural Network Analysis of Images for Mental States" Ser. No. 62/370,421, filed Aug. 3, 2016.

The patent application "Mental State Event Signature Usage" Ser. No. 15/262,197, filed Sep. 12, 2016, is also a continuation-in-part of U.S. patent application "Mental State Event Definition Generation" Ser. No. 14/796,419, filed Jul. 10, 2015, which claims the benefit of U.S. provisional patent applications "Mental State Event Definition Generation" Ser. No. 62/023,800, filed Jul. 11, 2014, "Facial Tracking with Classifiers" Ser. No. 62/047,508, filed Sep. 8, 2014, "Semiconductor Based Mental State Analysis" Ser. No. 62/082,579, filed Nov. 20, 2014, and "Viewership Analysis Based On Facial Evaluation" Ser. No. 62/128,974, filed Mar. 5, 2015.

The patent application "Mental State Event Definition Generation" Ser. No. 14/796,419, filed Jul. 10, 2015 is also a continuation-in-part of U.S. patent application "Mental State Analysis Using Web Services" Ser. No. 13/153,745, filed Jun. 6, 2011, which claims the benefit of U.S. provisional patent applications "Mental State Analysis Through Web Based Indexing" Ser. No. 61/352,166, filed Jun. 7, 2010, "Measuring Affective Data for Web-Enabled Applications" Ser. No. 61/388,002, filed Sep. 30, 2010, "Sharing Affect Across a Social Network" Ser. No. 61/414,451, filed Nov. 17, 2010, "Using Affect Within a Gaming Context" Ser. No. 61/439,913, filed Feb. 6, 2011, "Recommendation and Visualization of Affect Responses to Videos" Ser. No. 61/447,089, filed Feb. 27, 2011, "Video Ranking Based on Affect" Ser. No. 61/447,464, filed Feb. 28, 2011, and "Baseline Face Analysis" Ser. No. 61/467,209, filed Mar. 24, 2011.

The patent application "Mental State Event Definition Generation" Ser. No. 14/796,419, filed Jul. 10, 2015 is also a continuation-in-part of U.S. patent application "Mental State Analysis Using an Application Programming Interface" Ser. No. 14/460,915, Aug. 15, 2014, which claims the benefit of U.S. provisional patent applications "Application Programming Interface for Mental State Analysis" Ser. No. 61/867,007, filed Aug. 16, 2013, "Mental State Analysis Using an Application Programming Interface" Ser. No. 61/924,252, filed Jan. 7, 2014, "Heart Rate Variability Evaluation for Mental State Analysis" Ser. No. 61/916,190, filed Dec. 14, 2013, "Mental State Analysis for Norm Generation" Ser. No. 61/927,481, filed Jan. 15, 2014, "Expression Analysis in Response to Mental State Express Request" Ser. No. 61/953,878, filed Mar. 16, 2014, "Background Analysis of Mental State Expressions" Ser. No. 61/972,314, filed Mar. 30, 2014, and "Mental State Event Definition Generation" Ser. No. 62/023,800, filed Jul. 11, 2014.

The patent application "Mental State Analysis Using an Application Programming Interface" Ser. No. 14/460,915, Aug. 15, 2014 is also a continuation-in-part of U.S. patent application "Mental State Analysis Using Web Services" Ser. No. 13/153,745, filed Jun. 6, 2011, which claims the benefit of U.S. provisional patent applications "Mental State Analysis Through Web Based Indexing" Ser. No. 61/352,166, filed Jun. 7, 2010, "Measuring Affective Data for Web-Enabled Applications" Ser. No. 61/388,002, filed Sep. 30, 2010, "Sharing Affect Across a Social Network" Ser. No. 61/414,451, filed Nov. 17, 2010, "Using Affect Within a Gaming Context" Ser. No. 61/439,913, filed Feb. 6, 2011, "Recommendation and Visualization of Affect Responses to Videos" Ser. No. 61/447,089, filed Feb. 27, 2011, "Video Ranking Based on Affect" Ser. No. 61/447,464, filed Feb. 28, 2011, and "Baseline Face Analysis" Ser. No. 61/467,209, filed Mar. 24, 2011.

Each of the foregoing applications is hereby incorporated by reference in its entirety.

FIELD OF INVENTION

This application relates generally to machine-trained analysis and more particularly to multimodal machine learning for emotion metrics.

BACKGROUND

Visible and audible cues, such as facial expressions and speech, form the key components of human communication. As a result, human facial expressions and human sounds play critical roles at all levels of human communication. The human face is capable of assuming a wide and varied range of facial expressions. Facial expressions can be formed consciously and unconsciously, and can convey fundamental information such as mental states, moods, emotions, thoughts, reactions, and other information. The facial expressions are based on the physical movements or positions of facial muscles. The movements and positions of facial muscles form expressions that convey myriad emotions ranging from happy to sad, and include expressions of anger, fear, disgust, surprise, and many others. The facial expressions of a given person can be captured and analyzed. The facial expression analysis can be undertaken for purposes including facial recognition, identity confirmation, and determination of a range of emotions and mental states. The mental states include frustration, ennui, confusion, cognitive overload, skepticism, delight, satisfaction, calmness, stress, and many others. The human voice also can be captured and analyzed. Based on characteristics of the voice, including timbre, prosody, vocal register, vocal resonance, pitch, loudness, speech rate, and language content, the human voice further conveys critical information relating to mental states, moods, emotions, and so on.

Anthroposemiotics is a field of study which seeks to understand how humans communicate. Humans typically communicate to share information, to influence one another, or to persuade one another, among many other reasons and purposes. Human communication includes sounds such as speech and non-speech vocalizations. Human communication also includes nonverbal communication and visual communication. As a result, human voices and human facial expressions, eye contact, or touch, play a key role at all levels of human communication. The human face is capable of assuming a wide and varied range of facial expressions. Facial expressions can be formed consciously and unconsciously and can convey fundamental information such as cognitive content, emotions, thoughts, reactions, and other information. The facial expressions are formed by physical movements or positions of facial muscles. The movements and positions of facial muscles form expressions that convey numerous cognitive states ranging from happy to sad, including expressions of anger, fear, disgust, surprise, and many others.

Non-verbal communication takes place between and among people, without exchanging words. Non-verbal communication supplements verbal communication, and can be categorized as visual cues, distance cues, voice cues, and touch cues. Visual cues often include body language and facial expressions. An angry face and a smiling face convey opposite messages. Physical distance cues are also informative. Towering over another person threatens, while sitting with the person reassures. Voice cues, called paralanguage, include rate, pitch, volume, voice quality, or prosody. Loud and rapid speech can indicate anger or alarm, while soft and slow speech can indicate ease or comfort. Touch or haptic cues can also be used for non-verbal communication. A handshake can communicate welcome or confidence, and a welcomed touch can convey affection. In stark contrast to a welcomed touch, an unwelcomed touch can cause anger and disgust.

Data can be collected from a person for a variety of purposes. The data often includes video data and audio data. The video data can be analyzed to determine a facial expression, to perform facial recognition, to conduct identity confirmation, or to determine a range of cognitive states, including mental states or emotional states, that relate to the person. Similarly, the voice data can be analyzed for voice recognition, biometric confirmation, or cognitive states. The cognitive states can include frustration, ennui, confusion, cognitive overload, skepticism, delight, satisfaction, calmness, stress, and many others. As a result, human facial expressions and human voices play critical roles at all levels of human communication.

SUMMARY

Machine-trained analysis is used for multimodal machine learning. A plurality of information channels is captured into a computing device, where the plurality of information channels includes contemporaneous audio information and video information from an individual. Trained weights are learned on a multilayered convolutional computing system using the audio information and the video information from the plurality of information channels, where the trained weights cover both the audio information and the video information and are trained simultaneously, and where the learning facilitates emotional analysis of the audio information and the video information. Further information is captured into a second computing device, and the further information is analyzed using the trained weights to provide an emotion metric based on the further information.

Image data is collected at a client device of a user interacting with a media presentation. The media presentation can include live-feed video, video, still images, audio, and so on. The image data that is collected includes facial images of the user. One or more processors are used for analyzing the image data and the media presentation to extract emotional content of the facial images. The one or more processors can be coupled to the client device, and can be local processors, remote processors, cloud processors, mesh processors, etc. The emotional content can include one or more of sadness, stress, happiness, excitement, laughter, and so on. One or more emotional intensity metrics are determined based on the emotional content. The intensity metric can be based on the Facial Action Coding System (FACS) and can range from A (trace) to E (maximum). The one or more emotional intensity metrics are stored in a storage component. The storage component can be coupled to the client device, and can consist of a local, remote, cloud, or other storage component, etc. The one or more emotional intensity metrics, obtained from the storage component, are coalesced into a summary emotional intensity metric. The coalescing of the emotional intensity metrics can include counting occurrences of a specific emotion type within the emotional content. The summary emotional intensity metric is displayed on a screen. The screen can be coupled to the client device, can be visible by the client using the client device, and so on.

A computer-implemented method for machine-trained analysis is disclosed comprising: capturing, into a computing device, a plurality of information channels, wherein the plurality of information channels includes contemporaneous audio information and video information from an individual; learning, on a multilayered convolutional network; trained weights using the audio information and the video information from the plurality of information channels, wherein the trained weights are trained from both the audio information and the video information and are trained simultaneously, and wherein the learning facilitates emotional analysis of the audio information and the video information; and capturing, into a second computing device, further information and analyzing the further information using the trained weights to provide an emotion metric based on the further information.

Some embodiments further comprise collecting additional information with the plurality of information channels from a second individual and learning the trained weights while factoring in the additional information. In embodiments the further information includes only video data, and in embodiments the further information includes only audio data. In some embodiments, the audio information and the video information comprise multimodal emotional information. In other embodiments, the learning comprises early fusion combination of video data and audio data for the analyzing of the further information. In embodiments, a computer program product is embodied in a non-transitory computer readable medium for machine-trained analysis, the computer program product comprising code which causes one or more processors to perform operations of: capturing, into a computing device, a plurality of information channels, wherein the plurality of information channels includes contemporaneous audio information and video information from an individual; learning, on a multilayered convolutional network, trained weights using the audio information and the video information from the plurality of information channels, wherein the trained weights are trained from both the audio information and the video information and are trained simultaneously, and wherein the learning facilitates emotional analysis of the audio information and the video information; and capturing, into a second computing device, further information and analyzing the further information using the trained weights to provide an emotion metric based on the further information.

Various features, aspects, and advantages of numerous embodiments will become more apparent from the following description.

BRIEF DESCRIPTION OF THE DRAWINGS

The following detailed description of certain embodiments may be understood by reference to the following figures wherein.

DETAILED DESCRIPTION

Figure 1:
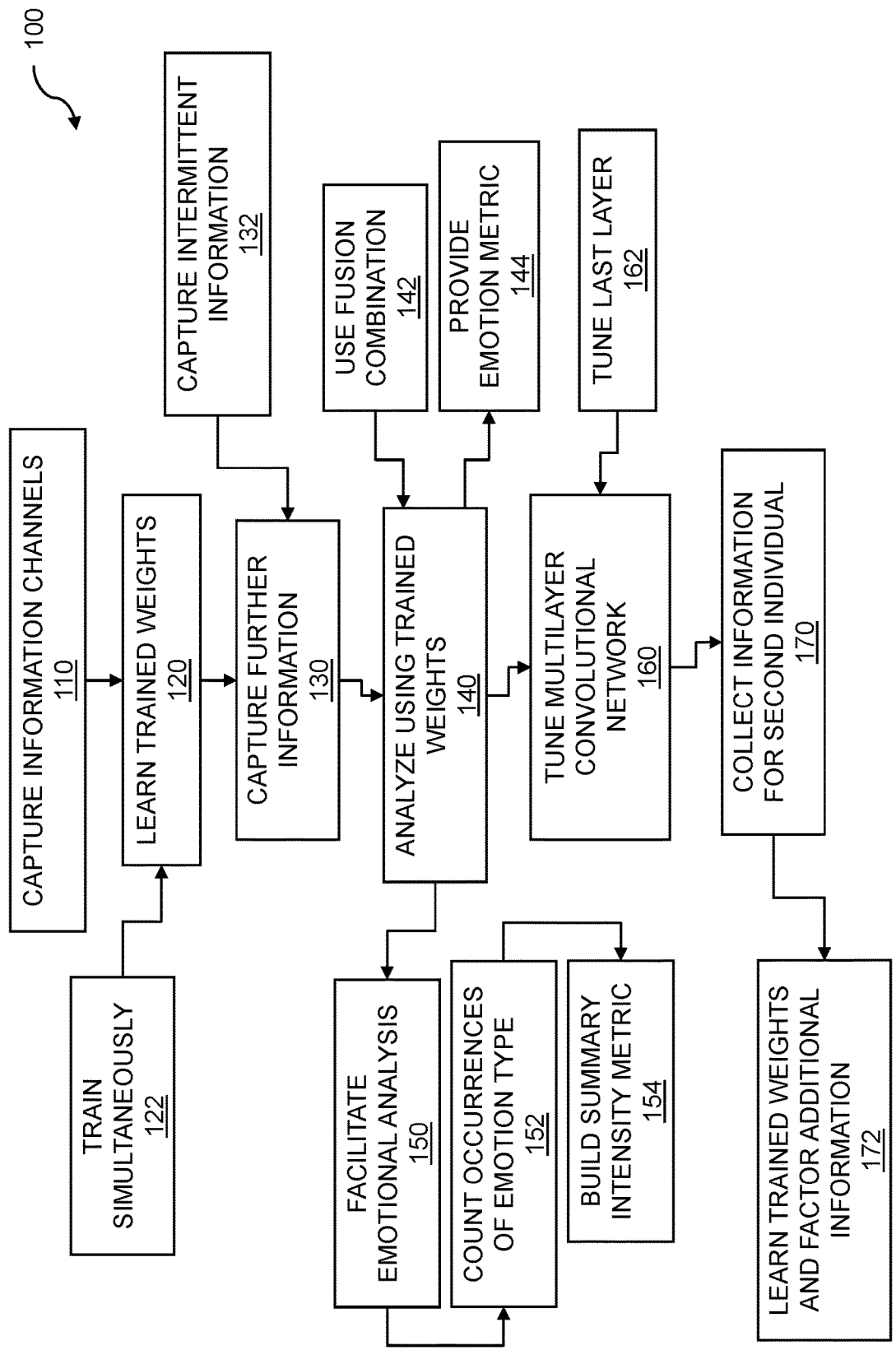
FIG. 1 is a flow diagram for machine-trained multimodal analysis.

Humans and animals alike continuously process visual and audio stimuli emanating from their environment. They experience their surroundings using their senses including sight, hearing, smell, touch, taste, and so on, to process the environmental data for a variety of purposes. The purposes for processing the environmental data include locating objects to seek or to avoid, looking and listening for potential dangers, discriminating loved ones and friends from those who are hostile or dangerous, among many other tasks. Much of the environmental data processing takes place at an instinctual or subconscious level. For example, a sudden movement caught in a person's peripheral vision, or a loud bang overhead or close by, can cause a shift of attention to focus on the source of the movement or sound. The shift causes the person to look for the source of the movement and to listen for the source of the noise. The shift of attention can be due to fear, surprise, interest, curiosity, and so on. If the movement is a glint of sunlight caught by a wave on a lake, the source is probably harmless and can be appreciated or ignored. If the bang is the report from fireworks, then again, the source is likely harmless to the observer. On the other hand, if the source of movement or sound is of an imminent danger, such as flashing lights or sirens, then expedient, evasive action is required immediately.

Humans observe each other's faces and listen to each other's voices when they interact. The degrees of interaction and of observation can vary from culture to culture. Whether the interactions include smell, touch, or any of the other senses, sight and sound play critical roles in social interaction. Sight is critical to human interaction because the human face is so highly expressive. The various facial expressions range widely from person to person and from culture to culture. The facial expressions can convey a mental state of a person, an emotional state of a person, and so on. For example, a seductive smile communicates to the recipient of the smile a very different message than does an angry frown. A neutral facial expression can indicate boredom, inattention, indifference, and so on. This exchange of "social information" between or among the participants in the interaction greatly influences how the interaction progresses. The smile may attract people to the interaction and retain them in it, while the angry frown, the sneer, or some other negative expression can cause people to leave the interaction, perhaps with haste. In this sense, facial expressions can control the interactions. Sound is also critical to human interaction. A cheerful laugh tends to attract attention, while angry shouting tends to repel attention. The combination of sight and sound adds additional information into interpersonal communications. While a smiling face and a cheery voice can indicate happiness, a menacing voice, even if accompanied with a smile, can convey a very different, much darker message.

Multimodal emotion sensing, where the modes can include video, audio, and so on, can be based on annotated audio-video data. The annotated audio-video data, of which there is little, can be found in datasets with manually annotated emotion labels. The datasets can include RECOLA™, IEMOCAP™, FAU™, AVEC 2011™, and so on. In order to build multimodal datasets that can generalize across language, gender, culture, other demographics, and other aspects of human life that contribute to emotional presentation, significantly larger emotion-annotated datasets are required. Semi-supervised and unsupervised techniques, some of which can be based on deep learning, can be used to annotate data with emotion labels.

Facial expressions can provide supervision for learning emotion tags on a speech channel which is parallel to a video channel. The natural synchrony between face and speech for expressing emotions can be leveraged to enhance the extraction of emotional content from speech. The alignment between a face and speech can be found by using a technique such as an autonomous training technique. The autonomous training technique can transfer discriminative facial expressions from robust face-based facial expression models into a speech modality. Emotion tag classifiers can be learned by ignoring the output layer of a deep network and by using the internal representation as features for training classifiers.

In disclosed techniques, machine-trained analysis is used for multimodal machine learning. A computing device captures a plurality of information channels, where the plurality of information channels includes contemporaneous audio information and video information from an individual. Trained weights are learned on a multilayered convolutional network using the audio information and the video information from the plurality of information channels, where the trained weights cover both the audio information and the video information and are trained simultaneously, and where the learning facilitates emotional analysis of the audio information and the video information. In embodiments, the multilayered convolutional network includes a multilayered convolutional computing system. In some embodiments, an unfolded network can be used in the emotion metric analysis, such as is accomplished using non-negative matrix factorization (NMF). Further information is captured into a second computing device, and the further information is analyzed using the trained weights to provide an emotion metric based on the further information.

FIG. 1 is a flow diagram for machine-trained multimodal analysis. Various disclosed techniques include machine-trained analysis for multimodal machine learning. The flow 100 includes capturing, into a computing device, a plurality of information channels 110, where the plurality of information channels includes contemporaneous audio information and video information from an individual. Contemporaneous audio and video information includes the synchronized speech and facial expressions of an individual. For example, a person raising the pitch of their voice as if to ask a question, while at the same time frowning, could indicate sarcasm, while if at the same time smiling, could indicate bemusement. The synchronization is not always exactly simultaneous, because vocal and facial expressions can be intimately related while also being somewhat offset in time. The computing device can include a handheld electronic device such as a smartphone, tablet, and personal digital assistant (PDA), a laptop computer, a desktop computer, a local server, a remote server, a cloud server, a distributed server, etc. The audio information can be captured with a microphone, a transducer, or other audio device compatible with the computing device such as a universal serial bus (USB) audio interface. The video information can be captured using a webcam or other camera, where webcam and the camera can include a video camera, a still camera, a thermal imager, a CCD device, a phone camera, a three-dimensional camera, a depth camera, a light field camera, a plenoptic camera, multiple webcams used to show different views of a person, or any other type of image capture apparatus that can allow captured data to be used in an electronic system. Other information channels can be captured, where the other information channels can include physiological data such as heart rate and respiration rate, kinetic information such as body movement, location information such as global positioning system (GPS) position, and so on.

The flow 100 includes learning, on a multilayered convolutional computing system, trained weights 120 using the audio information and the video information from the plurality of information channels, where the trained weights cover both the audio information and the video information and are trained simultaneously, and where the learning facilitates emotional analysis of the audio information and the video information. The multilayered convolutional computing system can include a neural network, where the neural network can be part of a machine learning technique. The multilayered convolutional computing system can include multiple layers. The multiple layers can include one or more convolutional layers and one or more hidden layers. The hidden layers may not be directly connected to an input or directly connected to an output of the multilayered convolutional computing system. The convolutional computing system can further include a max pooling layer. A max pooling layer can be used for nonlinear down sampling of data, where the maximum value within a given set, region, neighborhood, cluster, etc., of data is output. A layer from the multiple layers is fully connected. That is, the nodes of the connected layer are connected to each of the nodes in the previous layer.

The learning can include assigning weights to inputs on one or more layers within the multilayered analysis engine. The trained weights can be learned based on the data captured from the individual over a period of time. In embodiments, the computing device and the second computing device can be a same computing device. The weights can be trained based on information channels collected from a plurality of individuals. The assigning of weights can be based on learning, training, and so on. The assigning weights can be accomplished during a feed-forward pass through the multilayered analysis engine. The feed-forward pass can be based on the plurality of captured information channels. The weights can be updated during a backpropagation process through the multilayered analysis engine. The backpropagation process can be based on the success of the multilayered convolutional computing system to identify one or more emotions. Further embodiments can include learning image descriptors, as part of the multilayered convolutional computing system, for emotional content. The image descriptors can be used to describe facial image characteristics that can be related to mental states, emotional states, modes, and so on. In embodiments, the image descriptors can be identified based on a temporal co-occurrence with an external stimulus. The external stimulus can include an image, a sound, a combination of an image and a sound, and so on. The image descriptors can be identified based on a facial expression such as a smile resulting from an individual viewing a pleasing media presentation such as a cute puppy video.

In embodiments, the learning can include hybrid learning. Hybrid learning can use early fusion combination of portions of the audio information and the video information along with late fusion combination of portions of the audio information and the video information. The fusion can include using both audio information and video information for the learning of trained weights. In embodiments, the trained weights can cover both the audio information and the video information and can be trained simultaneously 122. The trained weights can cover other collected information including the physiological information, the kinetic information, and the like. Embodiments include performing unsupervised learning as part of training the multilayered convolutional network, or computing system. The unsupervised learning can be based on inferring a function that can describe a structure in the plurality of information channels. In some embodiments, learning includes using iterative semi-supervised updates of model weights in the learning. The semi-supervised updates can be provided by users or another expert system.

The flow 100 includes capturing, into a second computing device, further information 130. The second computing device can include a smartphone, a PDA, a tablet, a laptop computer, etc. In embodiments, the computing device and the second computing device are a same computing device. The further information can include further audio information, further video information, further physiological information, contextual information, etc. In embodiments, the plurality of information channels can include one or more of electrodermal activity, heart rate, heart rate variability, skin temperature, blood pressure, muscle movements, or respiration. Additional audio capture techniques and additional video capture techniques can be used to capture the further information. In embodiments, the capturing of further information comprises intermittent information 132. The capturing of intermittent information can occur when the one or more cameras have a line of sight to the individual, then not occur when there is no line of sight from the one or more cameras to the individual. The capturing of intermittent information can occur when the one or more microphones are within range of the individual to collect audio from the individual, then not occur when the one or more microphones are out of range of the individual. The capturing of intermittent information can occur when the additional information such as physiological data is available, then not occur when the additional information is unavailable, and so on. The capturing of further information can include independently capturing only video information, only audio information, only additional information, and so on. In embodiments, during the capturing of further information, one channel from the plurality of channels drops out, and the analyzing of the further information continues without the one channel that dropped out. The one channel that dropped out may become available again later in the capturing of further information.

The flow 100 includes analyzing the further information using the trained weights 140 to provide an emotion metric based on the further information. Based on the weights that can be trained, an emotional metric can be determined. The emotional metric can be based on a mental state, an emotional state, a mood, and so on. The emotional metric can include an emotion type, a number of occurrences of an emotion type, an intensity of an emotion type, a duration of an emotion type, etc. The flow 100 can include using fusion combination 142. Fusion combination can include early fusion combination, late fusion combination, both early fusion combination and late fusion combination, and so on. In embodiments, the learning includes early fusion combination of video data and audio data for the emotional analysis. The early fusion combination can be based on ensemble learning, where the ensemble learning can improve prediction performance of the multilayered convolutional computing system that uses the trained weights to predict emotions. The early fusion combination can be used to detect co-occurrences of audio and video events such as the co-occurrence of a laugh and a smile. In other embodiments, the learning can include hybrid learning using early fusion combination of portions of the audio information and the video information along with late fusion combination of portions of the audio information and the video information. The hybrid learning can be used to retrain the weights, to obtain faster convergence, and so on. The flow 100 includes providing an emotion metric 144 based on the further information. As discussed previously, the emotion metric can be based on the presence of an emotion, the number of occurrences of an emotion, an emotion intensity, and so on. The emotion metric can include an integer value, a range of values, a percentage, a threshold value, a label, a character string, and so on.

The flow 100 includes facilitating emotional analysis 150 of the audio information and the video information. The emotional analysis can be performed by a convolutional computing system such as a convolutional neural network. In embodiments, a multilayered convolutional computing system can comprise multiple layers that include one or more convolutional layers and one or more hidden layers. The multilayered convolutional computing system can include an input layer into which collected data can be fed. In embodiments, a last layer within the multiple layers provides output indicative of emotional state. The convolutional neural network can be included in a convolutional network for deep learning. The emotional analysis can be based on classifiers. The classifiers can be uploaded by a user, downloaded from the Internet, and the like. The classifier can be trained. Further embodiments include training an emotion classifier, as part of the multilayered convolutional computing system, for emotional content.

For the flow 100, emotional analysis further includes counting occurrences 152 of a specific emotion type within the emotional analysis. The counting occurrences can occur over a period of time such as a minute, hour, day, week, etc. The counting occurrences can be used to measure a threshold or goal for an emotional type. In embodiments, wherein the emotion type includes of one or more of sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, curiosity, humor, poignancy, or mirth. The flow 100 further includes building a summary emotional intensity metric 154 based on a number of the occurrences. The summary emotional intensity metric can include the types of emotions, the number of occurrences of the emotions, the onset time of the emotions, the duration of the emotions, the decay time of the emotions, and so on.

The flow 100 further includes tuning the multilayer convolutional network 160, or computer. The various layers of the multilayer convolutional computer can be tuned to improve analysis of one or more emotion types. As discussed previously, an emotion type can include one or more of sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, curiosity, humor, poignancy, or mirth. The tuning can include training weights used for the audio information, training weights used for the video information, training weights used for other collected information, and so on. The tuning can include back-propagation of values such as weights based on the success of the convolutional computing system to identify the one or more emotional types. The training can include forward propagation of values such as weights. The flow 100 further includes tuning the last layer within the multiple layers for a particular emotional state 162. The last layer, which can be a fully connected layer, can be tuned for one or more emotion types such as sadness, stress, happiness, anger, and so on.

The flow 100 further includes collecting additional information with the plurality of information channels from a second individual 170. The second individual can be co-located with the first individual, remotely located, and so on. The first individual and the second individual may be collaborating using one or more applications such as social networking applications, may be viewing the same media presentation, and so on. The collecting of additional information can use the same computing device as was used to capture information from the first individual, or can use a different computing device. In embodiments, the further information can include only video data. For a variety of capturing scenarios, one or more of the information channels may or may not be available. In one scenario, one or more video cameras may be able to capture video information, while the one or more audio microphones are not capturing audio data. The microphones may not be able to capture audio data for reasons such as the presence of a high volume of ambient noise. In embodiments, the further information includes only audio data. In another information-capturing scenario, the one or more video cameras may not have a line of sight to one or more individuals, while one or more of the audio microphones are in near-enough proximity to the one or more individuals to capture audio information. In embodiments, the audio information and the video information comprise multimodal emotional information. The flow 100 further includes learning the trained weights while factoring in the additional information 172. As discussed previously, the trained weights of a multilayered convolutional computing system can be trained using the audio information, the video information, the additional information, and so on. By factoring in the additional information, the detection of emotion metrics can improve training over a variety of visible and audible expressions of sadness, stress, happiness, anger, and so on. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
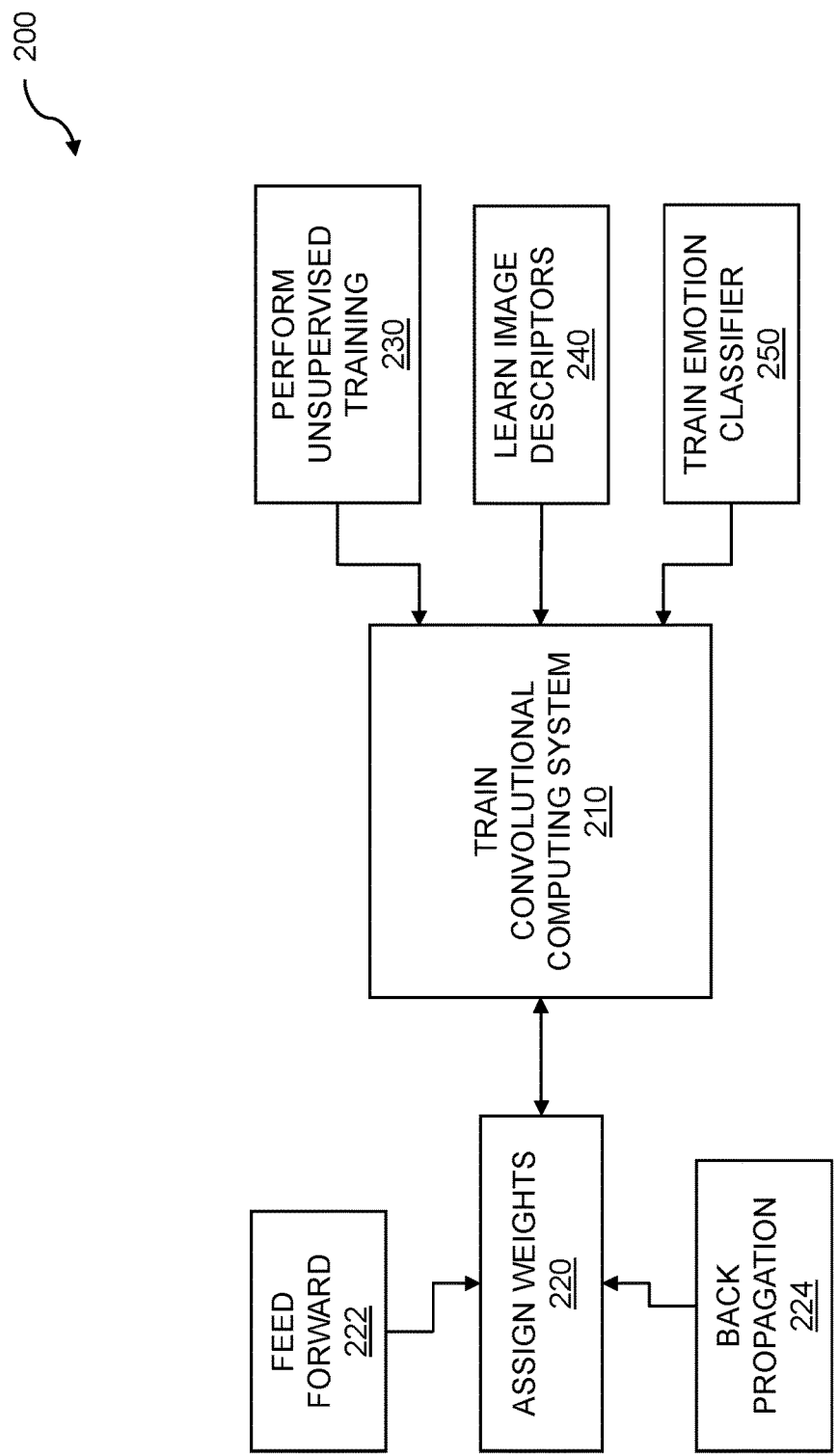
FIG. 2 is a flow diagram for training.

FIG. 2 is a flow diagram for training. Multimodal machine learning can be based on training. A plurality of information channels is captured into a computing device. The plurality of information channels includes contemporaneous audio information and video information from an individual. Trained weights are learned on a multilayered convolutional computing system. The trained weights are learned using the audio information and the video information from the plurality of information channels, where the trained weights cover both the audio information and the video information and are trained simultaneously, and where the learning facilitates emotional analysis of the audio information and the video information. Further information is captured into a second computing device. The further information is analyzed using the trained weights to provide an emotion metric based on the further information.

The flow 200 includes training a multilayered convolutional computing system 210. The training of the multilayered convolutional computing system can be based on learning trained weights. The learning trained weights can include assigning weights 220 to nodes at various levels within a multilayered convolutional computing system. The weights can be provided on inputs to the multiple layers to emphasize certain facial features within a face, to emphasize certain audio characteristics of a voice, and so on. The multilayered convolutional computing system can be trained to identify facial expressions, voice characteristics, etc. One or more of the weights can be adjusted or updated during training. The assigning weights can be accomplished during a feed-forward 222 pass through the multilayered convolutional computing system. In a feed-forward arrangement, the information moves forward from the input nodes, through the hidden nodes, and on to the output nodes. Additionally, the weights can be updated during a backpropagation 224 process through the multilayered analysis engine.

The multilayered convolutional computing system can include a convolutional neural network. The convolutional neural network can be trained to identify facial features, to identify audio features such as voice characteristics, and so on. The multilayered convolutional computing system can be trained using a variety of training techniques. In embodiments, the flow 200 includes unsupervised learning 230 and is performed as part of training the multilayered convolutional computing system. Unsupervised learning seeks to infer a function which can be used to describe a hidden structure in a dataset. The dataset is considered unlabeled in that no category or class has been assigned to the data a priori. Unsupervised learning is in contrast to supervised learning in which a known dataset is used to train the multilayered convolutional computing system, The flow 200 includes learning image descriptors 240. Image descriptors can include descriptions of visual features within a video, a video frame, an image, and so on. The image descriptors can include image characteristics such as color, motion, shape, texture, and so on. Audio descriptors may also be learned. The audio descriptors can include voice descriptors, where voice descriptors can include timbre, prosody, vocal register, vocal resonance, pitch, loudness, speech rate, language content, etc. The flow 200 includes training an emotion classifier 250. More than one emotion classifier can be trained. The emotion classifiers that are trained can be used to identify an emotion type, where the emotion type can include one or more of sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, curiosity, humor, poignancy, or mirth.

Figure 3:
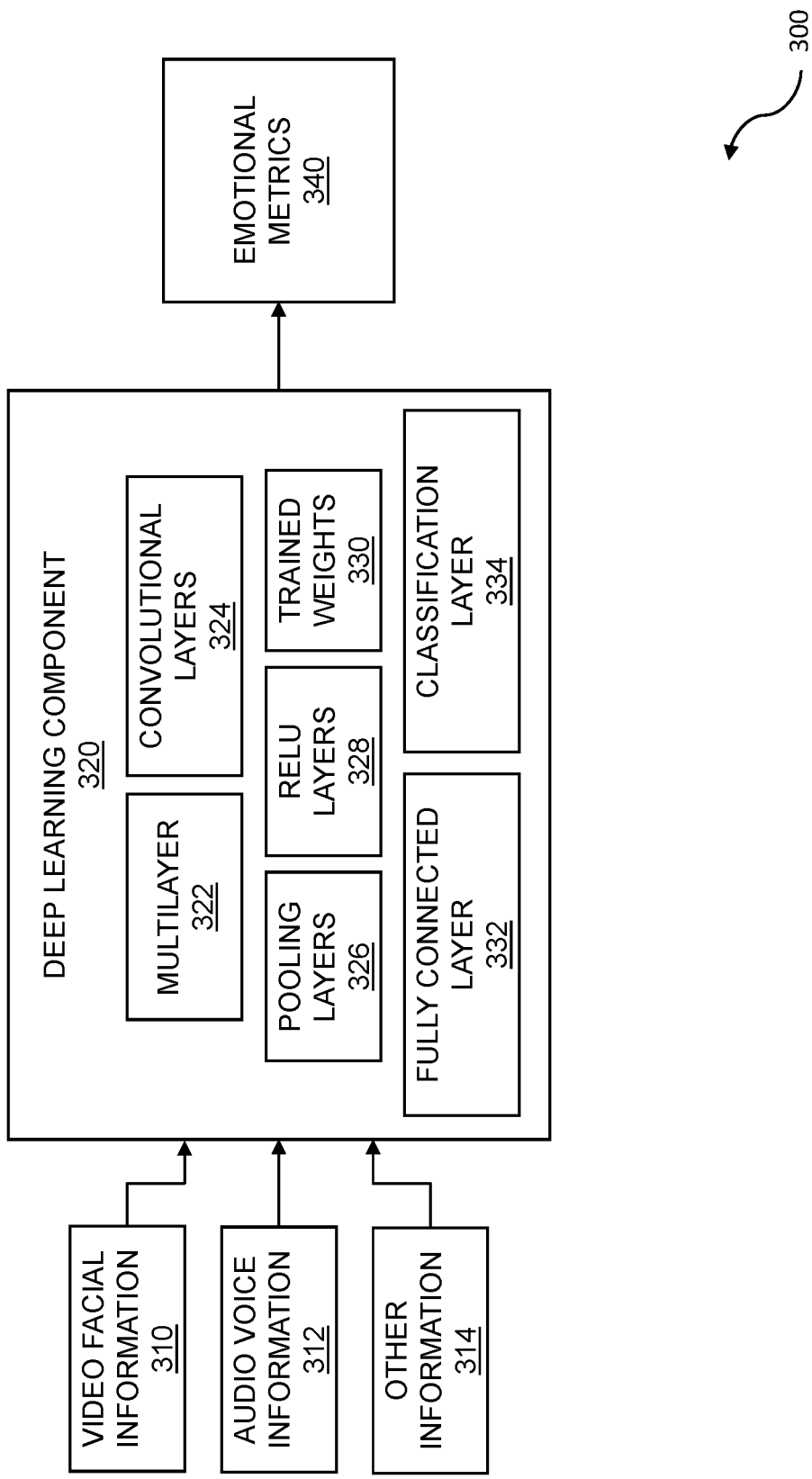
FIG. 3 shows a high-level diagram for deep learning.

FIG. 3 illustrates a high-level diagram for deep learning. Multimodal machine learning can be based on deep learning. A plurality of information channels is captured into a computing device such as a smartphone, personal digital assistant (PDA), tablet, laptop computer, and so on. The plurality of information channels includes contemporaneous audio information and video information from an individual. Trained weights are learned on a multilayered convolutional computing system. The trained weights are learned using the audio information and the video information from the plurality of information channels. The trained weights cover both the audio information and the video information and are trained simultaneously. The learning facilitates emotional analysis of the audio information and the video information. Further information is captured into a second computing device. The second computing device and the first computing device may be the same computing device. The further information can include physiological information, contextual information, and so on. The further information is analyzed using the trained weights to provide an emotion metric based on the further information.

Understanding and evaluating moods, emotions, or mental states requires a nuanced evaluation of facial expressions, audio expressions, or other cues generated by people. Mental state analysis is important in many areas such as research, psychology, business, intelligence, law enforcement, and so on. The understanding of mental states can be used in a variety of fields, such as improving marketing analysis, assessing the effectiveness of customer service experiences and retail experiences, and evaluating the consumption of content such as movies and videos. Identifying points of frustration in a customer transaction can allow a company to take action to address the causes of the frustration. By streamlining processes, key performance areas such as customer satisfaction and customer transaction throughput can be improved, resulting in increased sales and revenues.

Deep learning is a branch of machine learning which seeks to imitate in software the activity which takes place in layers of neurons in the neocortex of the human brain. Deep learning applications include processing of image data, audio data, and so on. FIG. 3 illustrates a high-level diagram for deep learning 300. The deep learning can be accomplished using a multilayered convolutional computing system, a convolutional neural network, or other techniques. The deep learning can accomplish image analysis, audio analysis, and other analysis tasks. A deep learning component 320 collects and analyzes various types of information from a plurality of information channels. The information channels can include video facial information 310, audio voice information 312, other information 314, and so on. In embodiments, the other information can include one or more of electrodermal activity, heart rate, heart rate variability, skin temperature, blood pressure, muscle movements, or respiration.

Returning to the deep learning component 320, the deep learning component can include a multilayered convolutional computing system 322. The multilayered convolutional computing system 322 can include a plurality of layers of varying types. The layers can include one or more convolutional layers 324 which can be used for learning and analysis. The convolutional layers can include pooling layers 326 which can combine the outputs of clusters into a single datum. The layers can include one or more Rectified Linear Unit (ReLU) layers 328. The one or more ReLU layers can implement an activation function such as $f(x)=\max(0,x)$, thus providing an activation with a threshold at zero. The convolutional layers can include trained weights 330. The trained weights can be based on learning, where the learning uses information collected from one or more individuals via a plurality of information channels. The trained weights can be used to enable the multilayer convolutional computing system to determine image characteristics, voice characteristics, and so on.

The deep learning component 320 can include a fully connected layer 332. The fully connected layer 332 processes each data point from the output of a collection of intermediate layers. The fully connected layer 332 takes all data points in the previous layer and connects them to every single node contained within the fully connected layer. The output of the fully connected layer 332 can provide input to a classification layer 334. The classification layer can be used to classify emotional states, mental states, moods, and so on. The classification can be based on using classifiers. The deep learning component 320 provides data that includes emotional metrics 340. The emotional metrics can include an emotional type, a number of occurrences of the emotional type, the intensity of the emotional type, and so on. The emotional metric can be based on a threshold value, on a target value, on a goal, etc. The emotional metric can be based on emotional types that can occur over a period of time. More than one emotional metric can be provided.

Figure 4:
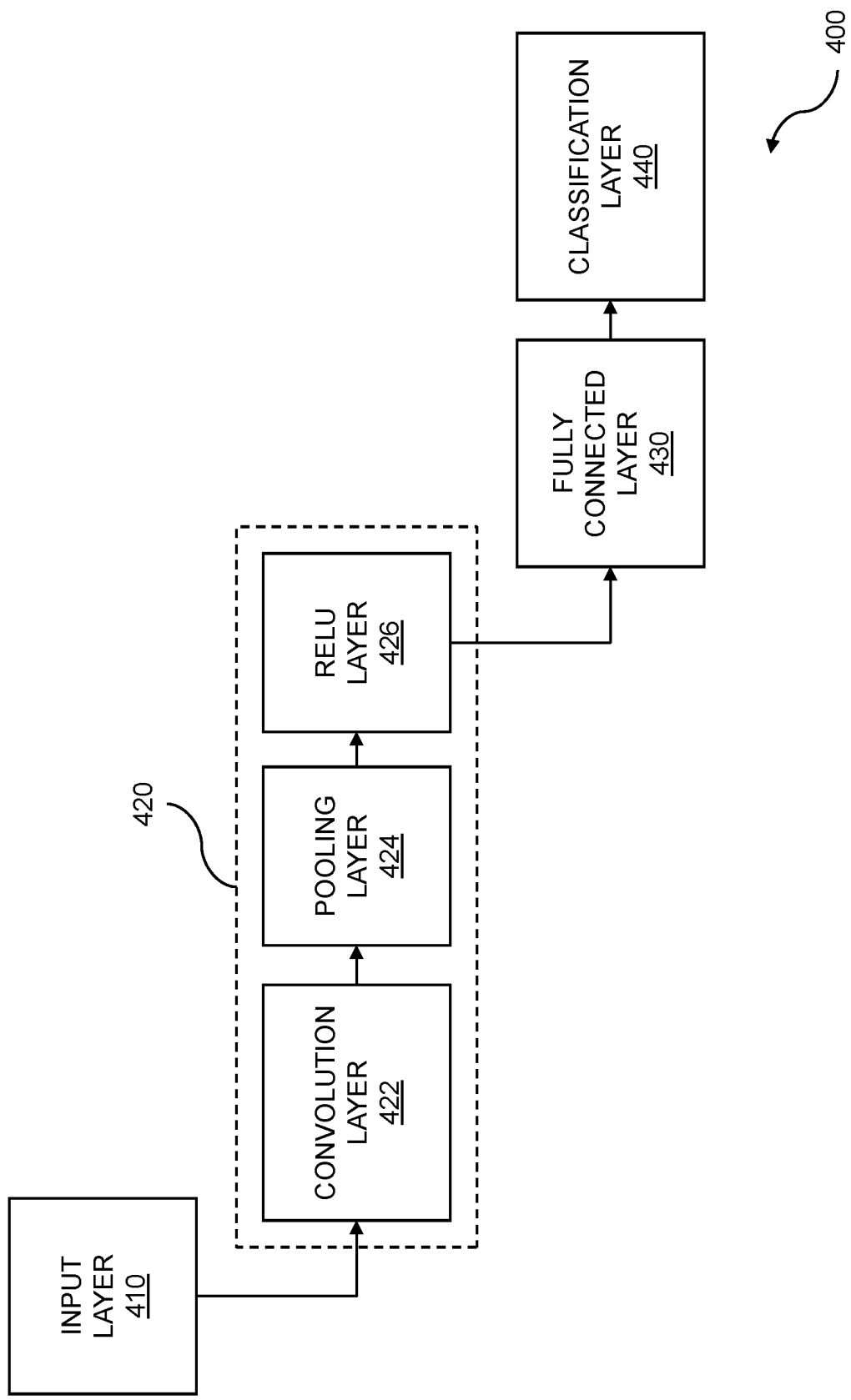
FIG. 4 is an example showing a convolutional neural network.

FIG. 4 is an example showing a convolutional neural network. A convolutional neural network can be used for multimodal machine learning. A plurality of information channels is captured into a computing device. The plurality of information channels includes contemporaneous audio information and video information from an individual. Trained weights are learned on a multilayered convolutional computing system. The trained weights are learned using the audio information and the video information from the plurality of information channels, where the trained weights cover both the audio information and the video information and are trained simultaneously, and where the learning facilitates emotional analysis of the audio information and the video information. Further information is captured into a second computing device. The further information is analyzed using the trained weights to provide an emotion metric based on the further information.

Emotion analysis is a very complex task. Understanding and evaluating moods, emotions, or mental states requires a nuanced evaluation of facial expressions or other cues generated by people. Mental state analysis is important in many areas such as research, psychology, business, intelligence, law enforcement, and so on. The understanding of mental states can be used in a variety of fields, such as improving marketing analysis, assessing the effectiveness of customer service experiences and retail experiences, and evaluating the consumption of content such as movies and videos. Identifying points of frustration in a customer transaction can allow a company to take action to address the causes of the frustration. By streamlining processes, key performance areas such as customer satisfaction and customer transaction throughput can be improved, resulting in increased sales and revenues. In a content scenario, producing compelling content that achieves the desired effect (e.g. fear, shock, laughter, etc.) can result in increased ticket sales and/or increased advertising revenue. If a movie studio is producing a horror movie, it is desirable to know if the scary scenes in the movie are achieving the desired effect. By conducting tests in sample audiences, and analyzing faces in the audience, a computer-implemented method and system can process thousands of faces to assess the mental state at the time of the scary scenes. In many ways, such an analysis can be more effective than surveys that ask audience members questions, since audience members may consciously or subconsciously change answers based on peer pressure or other factors. However, spontaneous facial expressions can be more difficult to conceal or control. Thus, by analyzing facial expressions en masse, important information regarding the mental state of the audience can be obtained.

Analysis of facial expressions is also a complex undertaking. Image data, where the image data can include facial data, can be analyzed to identify a range of facial expressions. The facial expressions can include a smile, frown, smirk, and so on. The image data and facial data can be processed to identify the facial expressions. The processing can include analysis of expression data, action units, gestures, mental states, physiological data, and so on. Facial data as contained in the raw video data can include information on one or more action units such as head gestures, smiles, brow furrows, squints, lowered eyebrows, raised eyebrows, attention, and the like. The action units can be used to identify smiles, frowns, and other facial indicators of expressions. Gestures can also be identified, and can include a head tilt to the side, a forward lean, a smile, a frown, as well as many other gestures. Other types of data including the physiological data can be obtained, where the physiological data can be obtained using a camera or other image capture device, without contacting the person or persons. Respiration, heart rate, heart rate variability, perspiration, temperature, and other physiological indicators of mental state can be determined by analyzing the images and video data.

Analysis of expressions emanating from human audio is also highly complex. Audio data can include speech, grunts, groans, shouts, screams, and so on. Further, the method of how the audio is produced can greatly influence the one or more expressions extracted from the audio. As a result, the audio data, such as voice data, can be evaluated for timbre, prosody, vocal register, vocal resonance, pitch, loudness, speech rate, language content, and so on. The evaluation results can be associated with mental states, emotional states, moods, and so on. For example, loud, rapid, shrill speech can indicate anger, while moderate, controlled speech including polysyllabic words can indicate confidence.

Deep learning is a branch of machine learning which seeks to imitate in software the activity which takes place in layers of neurons in the neocortex of the human brain. This imitative activity can enable software to "learn" to recognize and identify patterns in data, where the data can include digital forms of images, sounds, and so on. The deep learning software is used to simulate the large array of neurons of the neocortex. This simulated neocortex, or artificial neural network, can be implemented using mathematical formulas that are evaluated on processors. With the ever-increasing capabilities of the processors, increasing numbers of layers of the artificial neural network can be processed.

Deep learning applications include processing of image data, audio data, and so on. Image data applications include image recognition, facial recognition, etc. Image data applications can include differentiating dogs from cats, identifying different human faces, and the like. The image data applications can include identifying moods, mental states, emotional states, and so on, from the facial expressions of the faces that are identified. Audio data applications can include analyzing audio input such as ambient room sounds, physiological sounds such as breathing or coughing, noises made by an individual such as tapping and drumming, voices, and so on. The voice data applications can include analyzing a voice for timbre, prosody, vocal register, vocal resonance, pitch, loudness, speech rate, or language content. The voice data analysis can be used to determine one or more moods, mental states, emotional states, etc.

The artificial neural network which forms the basis for deep learning is based on layers. The layers can include an input layer, a convolution layer, a fully connected layer, a classification layer, and so on. The input layer can receive input data such as image data, where the image data can include a variety of formats including pixel formats. The input layer can then perform processing tasks such as identifying boundaries of the face, identifying landmarks of the face, extracting features of the face, and/or rotating a face within the plurality of images. The convolution layer can represent an artificial neural network such as a convolutional neural network. A convolutional neural network can contain a plurality of hidden layers within it. A convolutional layer can reduce the amount of data feeding into a fully connected layer. The fully connected layer processes each pixel/data point from the convolutional layer. A last layer within the multiple layers can provide output indicative of mental state. The last layer of the convolutional neural network can be the final classification layer. The output of the final classification layer can be indicative of mental state of faces within the images that are provided to input layer.

Deep networks including deep convolutional neural networks can be used for facial expression parsing. A first layer of the deep network includes multiple nodes, where each node represents a neuron within a neural network. The first layer can receive data from an input layer. The output of the first layer can feed to a second layer, where the latter layer also includes multiple nodes. A weight can be used to adjust the output of the first layer which is being input to the second layer. Some layers in the convolutional neural network can be hidden layers. The output of the second layer can feed to a third layer. The third layer can also include multiple nodes. A weight can adjust the output of the second layer which is being input to the third layer. The third layer may be a hidden layer. Outputs of a given layer can be fed to next layer. Weights adjust the output of one layer as it is fed to the next layer. When the final layer is reached, the output of the final layer can be a facial expression, a mental state, a characteristic of a voice, and so on. The facial expression can be identified using a hidden layer from the one or more hidden layers. The weights can be provided on inputs to the multiple layers to emphasize certain facial features within the face. The convolutional neural network can be trained to identify facial expressions, voice characteristics, etc. The training can include assigning weights to inputs on one or more layers within the multilayered analysis engine. One or more of the weights can be adjusted or updated during training. The assigning of weights can be accomplished during a feed-forward pass through the multilayered neural network. In a feed-forward arrangement, the information moves forward, from the input nodes, through the hidden nodes and on to the output nodes. Additionally, the weights can be updated during a backpropagation process through the multilayered analysis engine.

Returning to the figure, FIG. 4 illustrates a system diagram 400 for deep learning. The system for deep learning can be used for multimodal machine learning. The system for deep learning can be accomplished using a convolution neural network or other techniques. The deep learning can accomplish facial recognition and analysis tasks. The network includes an input layer 410. The input layer 410 receives image data. The image data can be input in a variety of formats, such as JPEG, TIFF, BMP, and GIF. Compressed image formats can be decompressed into arrays of pixels, wherein each pixel can include an RGB tuple. The input layer 410 can then perform processing such as identifying boundaries of the face, identifying landmarks of the face, extracting features of the face, and/or rotating a face within the plurality of images.

The network includes a collection of intermediate layers 420. The multilayered analysis engine can include a convolutional neural network. Thus, the intermediate layers can include a convolution layer 422. The convolution layer 422 can include multiple sublayers, including hidden layers within it. The output of the convolution layer 422 feeds into a pooling layer 424. The pooling layer 424 performs a data reduction, which makes the overall computation more efficient. Thus, the pooling layer reduces the spatial size of the image representation to reduce the number of parameters and computation in the network. In some embodiments, the pooling layer is implemented using filters of size 2×2, applied with a stride of two samples for every depth slice along both width and height, resulting in a reduction of 75-percent of the downstream node activations. The multilayered analysis engine can further include a max pooling layer 424. Thus, in embodiments, the pooling layer is a max pooling layer, in which the output of the filters is based on a maximum of the inputs. For example, with a 2×2 filter, the output is based on a maximum value from the four input values. In other embodiments, the pooling layer is an average pooling layer or L2-norm pooling layer. Various other pooling schemes are possible.

The intermediate layers can include a Rectified Linear Units (ReLU) layer 426. The output of the pooling layer 424 can be input to the ReLU layer 426. In embodiments, the ReLU layer implements an activation function such as $f(x)-\max(0,x)$, thus providing an activation with a threshold at zero. In some embodiments, the ReLU layer 426 is a leaky ReLU layer. In this case, instead of the activation function providing zero when x<0, a small negative slope is used, resulting in an activation function such as $f(x)=1(x<0)(\alpha x)+1(x>=0)(x)$. This can reduce the risk of "dying ReLU" syndrome, where portions of the network can be "dead" with nodes/neurons that do not activate across the training dataset. The image analysis can comprise training a multilayered analysis engine using the plurality of images, wherein the multilayered analysis engine can comprise multiple layers that include one or more convolutional layers 422 and one or more hidden layers, and wherein the multilayered analysis engine can be used for emotional analysis.

The example 400 includes a fully connected layer 430. The fully connected layer 430 processes each pixel/data point from the output of the collection of intermediate layers 420. The fully connected layer 430 takes all neurons in the previous layer and connects them to every single neuron it has. The output of the fully connected layer 430 provides input to a classification layer 440. The output of the classification layer 440 provides a facial expression and/or mental state as its output. Thus, a multilayered analysis engine such as the one depicted in FIG. 4 processes image data using weights, models the way the human visual cortex performs object recognition and learning, and provides effective analysis of image data to infer facial expressions and mental states.

Figure 5:
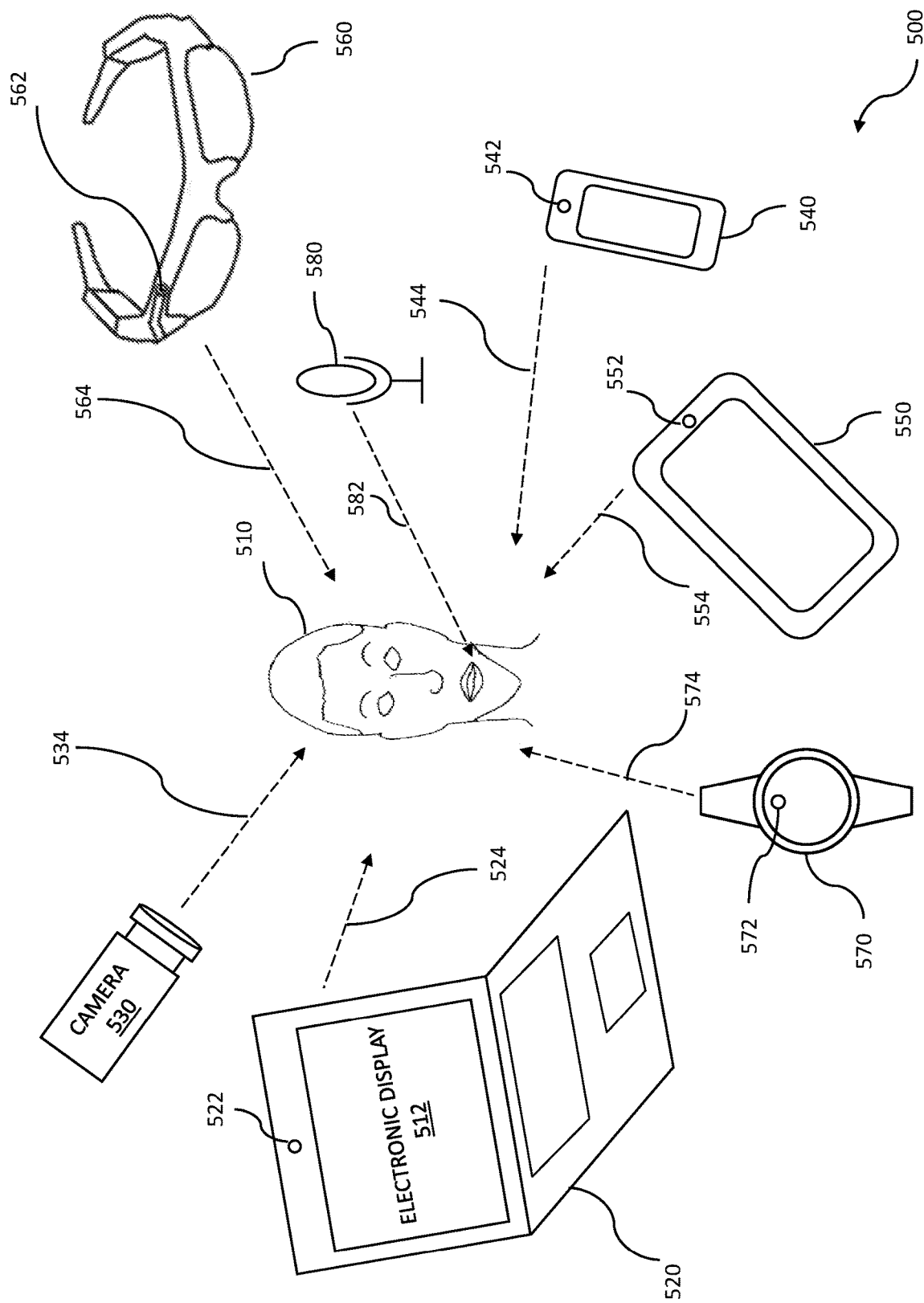
FIG. 5 is a diagram showing image and audio collection including multiple mobile devices.

FIG. 5 is a diagram showing image and audio collection including multiple mobile devices. Multimodal machine learning can be based on using multiple mobile devices for collecting image and audio data. A plurality of information channels is captured into a computing device such as a smartphone, personal digital assistant (PDA), tablet, laptop computer, and so on. The plurality of information channels includes contemporaneous audio information and video information from an individual. Trained weights are learned on a multilayered convolutional computing system. The trained weights are learned using the audio information and the video information from the plurality of information channels. The trained weights cover both the audio information and the video information and are trained simultaneously. The learning facilitates emotional analysis of the audio information and the video information. Further information is captured into a second computing device. The second computing device and the first computing device may be the same computing device. The further information can include physiological information, contextual information, and so on. The further information is analyzed using the trained weights to provide an emotion metric based on the further information.

In the diagram 500, the multiple mobile devices can be used individually or together to collect video data and audio data on a user 510. While one person is shown, the video data and audio data can be collected on multiple people. A user 510 can be observed as she or he is performing a task, experiencing an event, viewing a media presentation, and so on. The user 510 can be shown one or more media presentations, political presentations, social media, or another form of displayed media. The one or more media presentations can be shown to a plurality of people. The media presentations can be displayed on an electronic display 512 or another display. The data collected on the user 510 or on a plurality of users can be in the form of one or more videos, video frames, still images, etc. The plurality of videos can be of people who are experiencing different situations. Some example situations can include the user or plurality of users being exposed to TV programs, movies, video clips, social media, and other such media. The situations could also include exposure to media such as advertisements, political messages, news programs, and so on. As noted before, video data can be collected on one or more users in substantially identical or different situations and viewing either a single media presentation or a plurality of presentations. The data collected on the user 510 can be analyzed and viewed for a variety of purposes including expression analysis, mental state analysis, and so on. The electronic display 512 can be on a laptop computer 520 as shown, a tablet computer 550, a cell phone 540, a television, a mobile monitor, or any other type of electronic device. In one embodiment, expression data is collected on a mobile device such as a cell phone 540, a tablet computer 550, a laptop computer 520, or a watch 570. Thus, the multiple sources can include at least one mobile device, such as a phone 540 or a tablet 550, or a wearable device such as a watch 570 or glasses 560. A mobile device can include a front-side camera and/or a back-side camera that can be used to collect facial expression data. Sources of facial expression data can include a webcam 522, a phone camera 542, a tablet camera 552, a wearable camera 562, and a mobile camera 530. A wearable camera can comprise various camera devices, such as a watch camera 572.

As the user 510 is monitored, the user 510 might move due to the nature of the task, boredom, discomfort, distractions, or for another reason. As the user moves, the camera with a view of the user's face can be changed. Thus, as an example, if the user 510 is looking in a first direction, the line of sight 524 from the webcam 522 is able to observe the user's face, but if the user is looking in a second direction, the line of sight 534 from the mobile camera 530 is able to observe the user's face. Furthermore, in other embodiments, if the user is looking in a third direction, the line of sight 544 from the phone camera 542 is able to observe the user's face, and if the user is looking in a fourth direction, the line of sight 554 from the tablet camera 552 is able to observe the user's face. If the user is looking in a fifth direction, the line of sight 564 from the wearable camera 562, which can be a device such as the glasses 560 shown and can be worn by another user or an observer, is able to observe the user's face. If the user is looking in a sixth direction, the line of sight 574 from the wearable watch-type device 570, with a camera 572 included on the device, is able to observe the user's face. In other embodiments, the wearable device is another device, such as an earpiece with a camera, a helmet or hat with a camera, a clip-on camera attached to clothing, or any other type of wearable device with a camera or other sensor for collecting expression data. The user 510 can also use a wearable device including a camera for gathering contextual information and/or collecting expression data on other users. Because the user 510 can move her or his head, the facial data can be collected intermittently when she or he is looking in the direction of a camera. In some cases, multiple people can be included in the view from one or more cameras, and some embodiments include filtering out faces of one or more other people to determine whether the user 510 is looking toward a camera. All or some of the expression data can be continuously or sporadically available from the various devices and other devices.

The captured video data can include facial expressions and can be analyzed on a computing device such as the video capture device or on another separate device. The analysis can take place on one of the mobile devices discussed above, on a local server, on a remote server, and so on. In embodiments, some of the analysis takes place on the mobile device, while other analysis takes place on a server device. The analysis of the video data can include the use of a classifier. The video data can be captured using one of the mobile devices discussed above and sent to a server or another computing device for analysis. However, the captured video data including expressions can also be analyzed on the device which performed the capturing. The analysis can be performed on a mobile device where the videos were obtained with the mobile device and wherein the mobile device includes one or more of a laptop computer, a tablet, a PDA, a smartphone, a wearable device, and so on. In another embodiment, the analyzing comprises using a classifier on a server or another computing device other than the capturing device.

In addition to the video data, audio data can also be collected from the user 510. The audio data can be collected using a microphone 580, a transducer, an electronic audio capture device such as a universal serial bus (USB) audio interface, and so on. The microphone 580 can record 582 the user 510 in order to capture the audio data. More than one microphone can be used for collecting audio data from the user 510. Audio devices such as microphones can be coupled to one or more of the multiple mobile devices shown. The audio devices can be built into the multiple mobile devices. The audio data can be collected contemporaneously with the video data, collected separately from the collecting of the video data, and so on. As for the collecting of the video data, the collecting of the audio data can be intermittent. The intermittent collection of the audio data can be due to the user moving toward or away from a microphone or other audio collection device, random ambient noise, and so on.

Figure 6:
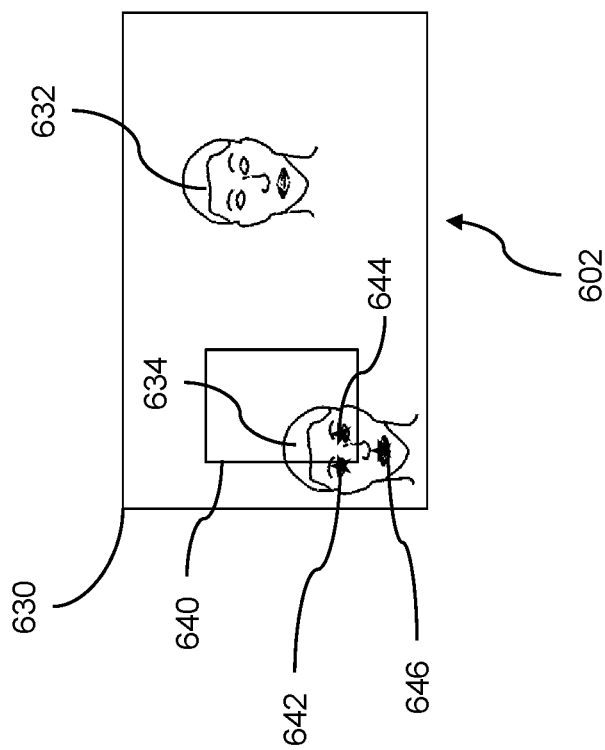
FIG. 6 illustrates feature extraction for multiple faces.
Figure 6:
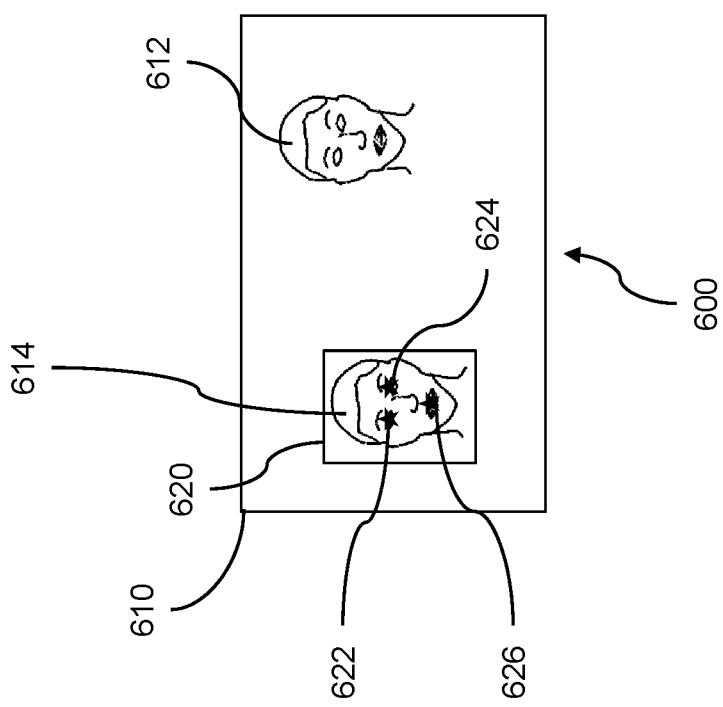

FIG. 6 illustrates feature extraction for multiple faces. Feature extraction for multiple faces can be used for machine-trained analysis for multimodal machine learning. A plurality of information channels is captured into a computing device. The plurality of information channels includes contemporaneous audio information and video information from an individual. Trained weights are learned on a multilayered convolutional computing system. The trained weights are learned using the audio information and the video information from the plurality of information channels, where the trained weights cover both the audio information and the video information and are trained simultaneously, and where the learning facilitates emotional analysis of the audio information and the video information. Further information is captured into a second computing device. The further information is analyzed using the trained weights to provide an emotion metric based on the further information.

The feature extraction for multiple faces can be performed for faces that can be detected in multiple images. The collected images can be analyzed for emotional metric generation. Image data, including facial images, is collected from a user interacting with a media presentation. Processors are used to analyze both the image data and the media presentation to extract emotional content. Emotional intensity metrics are determined and retained in a storage component. The emotional intensity metrics are coalesced into a summary intensity metric, which is displayed on a screen. The images can be collected from people as they interact with the Internet. In embodiments, the features of multiple faces are extracted for evaluating mental states. Features of a face or a plurality of faces can be extracted from collected video data. Feature extraction for multiple faces can be based on analyzing, using one or more processors, the mental state data for providing analysis of the mental state data to the individual. The feature extraction can be performed by analysis using one or more processors, using one or more video collection devices, and by using a server. The analysis device can be used to perform face detection for a second face, as well as for facial tracking of the first face. One or more videos can be captured, where the videos contain one or more faces. The video or videos that contain the one or more faces can be partitioned into a plurality of frames, and the frames can be analyzed for the detection of the one or more faces. The analysis of the one or more video frames can be based on one or more classifiers. A classifier can be an algorithm, heuristic, function, or piece of code that can be used to identify into which of a set of categories a new or particular observation, sample, datum, etc. should be placed. The decision to place an observation into a category can be based on training the algorithm or piece of code by analyzing a known set of data, known as a training set. The training set can include data for which category memberships of the data can be known. The training set can be used as part of a supervised training technique. If a training set is not available, then a clustering technique can be used to group observations into categories. The latter approach, or unsupervised learning, can be based on a measure (i.e. distance) of one or more inherent similarities among the data that is being categorized. When the new observation is received, then the classifier can be used to categorize the new observation. Classifiers can be used for many analysis applications, including analysis of one or more faces. The use of classifiers can be the basis of analyzing the one or more faces for gender, ethnicity, and age; for detection of one or more faces in one or more videos; for detection of facial features; for detection of facial landmarks, and so on. The observations can be analyzed based on one or more of a set of quantifiable properties. The properties can be described as features and explanatory variables and can include various data types that can include numerical (integer-valued, real-valued), ordinal, categorical, and so on. Some classifiers can be based on a comparison between an observation and prior observations, as well as based on functions such as a similarity function, a distance function, and so on.

Classification can be based on various types of algorithms, heuristics, codes, procedures, statistics, and so on. Many techniques exist for performing classification. This classification of one or more observations into one or more groups can be based on distributions of the data values, probabilities, and so on. Classifiers can be binary, multiclass, linear, and so on. Algorithms for classification can be implemented using a variety of techniques, including neural networks, kernel estimation, support vector machines, use of quadratic surfaces, and so on. Classification can be used in many application areas such as computer vision, speech and handwriting recognition, and so on. Classification can be used for biometric identification of one or more people in one or more frames of one or more videos.

Returning to FIG. 6, the detection of the first face, the second face, and multiple faces can include identifying facial landmarks, generating a bounding box, and the predicting of a bounding box and landmarks for a next frame, where the next frame can be one of a plurality of frames of a video containing faces. A first video frame 600 includes a frame boundary 610, a first face 612, and a second face 614. The video frame 600 also includes a bounding box 620. Facial landmarks can be generated for the first face 612. Face detection can be performed to initialize a second set of locations for a second set of facial landmarks for a second face within the video. Facial landmarks in the video frame 600 can include the facial landmarks 622, 624, and 626. The facial landmarks can include corners of a mouth, corners of eyes, eyebrow corners, the tip of the nose, nostrils, chin, the tips of ears, and so on. The performing of face detection on the second face can include performing facial landmark detection with the first frame from the video for the second face, and can include estimating a second rough bounding box for the second face based on the facial landmark detection. The estimating of a second rough bounding box can include the bounding box 620. Bounding boxes can also be estimated for one or more other faces within the boundary 610. The bounding box can be refined, as can one or more facial landmarks. The refining of the second set of locations for the second set of facial landmarks can be based on localized information around the second set of facial landmarks. The bounding box 620 and the facial landmarks 622, 624, and 626 can be used to estimate future locations for the second set of locations for the second set of facial landmarks in a future video frame from the first video frame.

A second video frame 602 is also shown. The second video frame 602 includes a frame boundary 630, a first face 632, and a second face 634. The second video frame 602 also includes a bounding box 640 and the facial landmarks, or points, 642, 644, and 646. In other embodiments, multiple facial landmarks are generated and used for facial tracking of the two or more faces of a video frame, such as the second face shown video frame 602. Facial points from the first face can be distinguished from other facial points. In embodiments, the other facial points include facial points of one or more other faces. The facial points can correspond to the facial points of the second face. The distinguishing of the facial points of the first face and the facial points of the second face can be used to distinguish between the first face and the second face, to track either or both the first face and the second face, and so on. Other facial points can correspond to the second face. As mentioned above, multiple facial points can be determined within a frame. One or more of the other facial points that are determined can correspond to a third face. The location of the bounding box 640 can be estimated, where the estimating can be based on the location of the generated bounding box 620 shown in the first video frame 600. The three facial points shown, or landmarks 642, 644, and 646, might lie completely within the bounding box 640 or might lie partially outside the bounding box 640. For instance, the second face 634 might have moved between the first video frame 600 and the second video frame 602. Based on the accuracy of the estimating of the bounding box 640, a new estimation can be determined for a third, future frame from the video, and so on. The evaluation can be performed, all or in part, on semiconductor-based logic.

Figure 7:
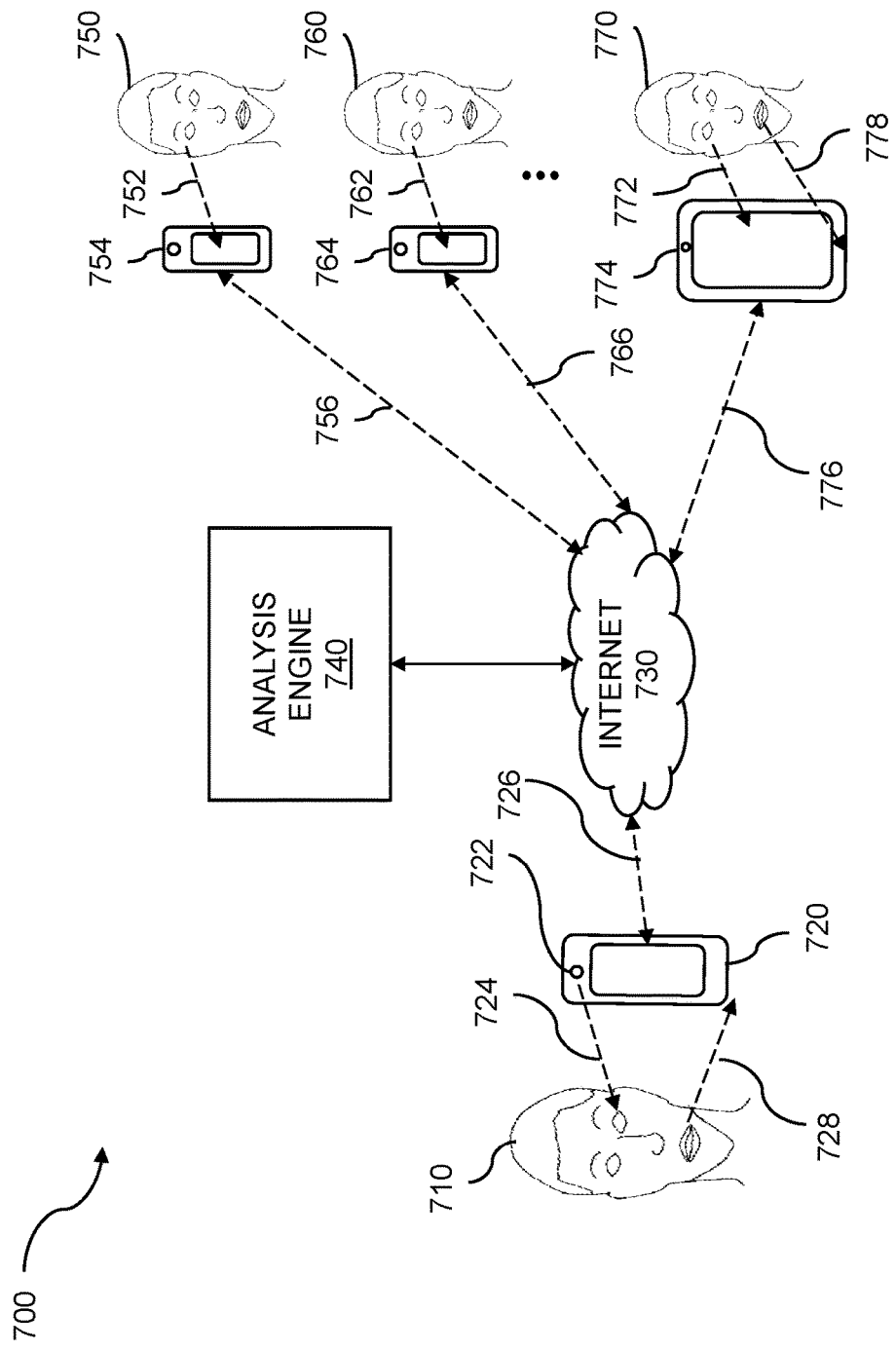
FIG. 7 shows live streaming of social video and audio.

FIG. 7 shows live streaming of social video and audio. Live streaming of social video and audio can be performed for multimodal machine learning. A plurality of information channels is captured into a computing device such as a smartphone, personal digital assistant (PDA), tablet, laptop computer, and so on. The plurality of information channels includes contemporaneous audio information and video information from an individual. Trained weights are learned on a multilayered convolutional computing system. The trained weights are learned using the audio information and the video information from the plurality of information channels. The trained weights cover both the audio information and the video information and are trained simultaneously. The learning facilitates emotional analysis of the audio information and the video information. Further information is captured into a second computing device. The second computing device and the first computing device may be the same computing device. The further information can include physiological information, contextual information, and so on. The further information is analyzed using the trained weights to provide an emotion metric based on the further information.

The streaming of social video and social audio can include people as they interact with the Internet. A video of a person or people can be transmitted via live streaming. Audio of a person or people can be similarly transmitted via live streaming. Image data and facial images are collected from a user interacting with a media presentation. Processors are used to analyze the image data and media presentation, and to extract emotional content of the viewer. Emotional intensity metrics are determined from the emotional content, and the emotional intensity metrics are retained in storage components. The emotional intensity metrics are coalesced into a summary emotional intensity metric, and the summary emotional intensity metric is displayed on a screen. The streaming and analysis can be facilitated by a video capture device, a local server, a remote server, semiconductor-based logic, and so on. The streaming can be live streaming and can include mental state analysis, mental state event signature analysis, etc. Live streaming video is an example of one-to-many social media, where video can be sent over the Internet from one person to a plurality of people using a social media app and/or platform. Live streaming is one of numerous popular techniques used by people who want to disseminate ideas, send information, provide entertainment, share experiences, and so on. Some of the live streams can be scheduled, such as webcasts, online classes, sporting events, news, computer gaming, or video conferences, while others can be impromptu streams that are broadcast as needed or when desirable. Examples of impromptu live stream videos can range from individuals simply sharing experiences with their social media followers to live coverage of breaking news, emergencies, or natural disasters. The latter coverage is known as mobile journalism, or "mo jo", and is becoming increasingly common. With this type of coverage, news reporters can use networked, portable electronic devices to provide mobile journalism content to a plurality of social media followers. Such reporters can be quickly and inexpensively deployed as the need or desire arises.

Several live streaming social media apps and platforms can be used for transmitting video. One such video social media app is Meerkat™ that can link with a user's Twitter™ account. Meerkat™ enables a user to stream video using a handheld, networked electronic device coupled to video capabilities. Viewers of the live stream can comment on the stream using tweets that can be seen by and responded to by the broadcaster. Another popular app is Periscope™ that can transmit a live recording from one user to that user's Periscope™ account and to other followers who join the broadcast. The Periscope™ app can be executed on a mobile device. The user's Periscope™ followers can receive an alert whenever that user begins a video transmission. Another live-stream video platform is Twitch™ that can be used for video streaming of video gaming and broadcasts of various competitions and events.

The example 700 shows a user 710 broadcasting a video live stream and an audio live stream to one or more people as shown by the person 750, the person 760, and the person 770. A portable, network-enabled, electronic device 720 can be coupled to a front-side camera 722 and can be coupled to an internal or external microphone (not shown). The portable electronic device 720 can be a smartphone, a PDA, a tablet, a laptop computer, and so on. The camera 722 coupled to the device 720 can have a line-of-sight view 724 to the user 710 and can capture video of the user 710. The microphone can record 728 the user 710. The captured video and captured audio can be sent to an analysis or recommendation engine 740 using a network link 726 to the Internet 730. The network link can be a wireless link, a wired link, and so on. The recommendation engine 740 can recommend to the user 710 an app and/or platform that can be supported by the server and can be used to provide a video live stream to one or more followers of the user 710. In the example 700, the user 710 has three followers: the person 750, the person 760, and the person 770. Each follower has a line-of-sight view to a video screen on a portable, networked electronic device. Each follower can hear the user 710 via internal or external speakers coupled to a portable, networked electronic device. In other embodiments, one or more followers can follow the user 710 using any other networked electronic device, including a computer. In the example 700, the person 750 has a line-of-sight view 752 to the video screen of a device 754; the person 760 has a line-of-sight view 762 to the video screen of a device 764, and the person 770 has a line-of-sight view 772 to the video screen of a device 774. The portable electronic devices 754, 764, and 774 can each be a smartphone, a PDA, a tablet, and so on. Each portable device can receive the video stream being broadcast by the user 710 through the Internet 730 using the app and/or platform that can be recommended by the recommendation engine 740. The device 754 can receive a video stream using the network link 756, the device 764 can receive a video stream using the network link 766, the device 774 can receive a video stream using the network link 776, and so on. The network link can be a wireless link, a wired link, a hybrid link, and so on. Depending on the app and/or platform that can be recommended by the recommendation engine 740, one or more followers, such as the followers 750, 760, 770, and so on, can reply to, comment on, and otherwise provide feedback to the user 710 using their devices 754, 764, and 774, respectively. One user 770 is shown who can provide audio data 778 using an internal or external microphone (not shown) coupled to the portable electronic device 774.

The human face provides a powerful communications medium through its ability to exhibit a myriad of expressions that can be captured and analyzed for a variety of purposes. In some cases, media producers are acutely interested in evaluating the effectiveness of message delivery by video media. Such video media includes advertisements, political messages, educational materials, television programs, movies, government service announcements, etc. Automated facial analysis can be performed on one or more video frames containing a face in order to detect facial action. Based on the facial action detected, a variety of parameters can be determined, including affect valence, spontaneous reactions, facial action units, and so on. The parameters that are determined can be used to infer or predict emotional and mental states. For example, determined valence can be used to describe the emotional reaction of a viewer to a video media presentation or another type of presentation. Positive valence provides evidence that a viewer is experiencing a favorable emotional response to the video media presentation, while negative valence provides evidence that a viewer is experiencing an unfavorable emotional response to the video media presentation. Other facial data analysis can include the determination of discrete emotional states of the viewer or viewers.

Facial data can be collected from a plurality of people using any of a variety of cameras. A camera can include a webcam, a video camera, a still camera, a thermal imager, a CCD device, a phone camera, a three-dimensional camera, a depth camera, a light field camera, multiple webcams used to show different views of a person, or any other type of image capture apparatus that can allow captured data to be used in an electronic system. In some embodiments, the person is permitted to "opt-in" to the facial data collection. For example, the person can agree to the capture of facial data using a personal device such as a mobile device or another electronic device by selecting an opt-in choice. Opting-in can then turn on the person's webcam-enabled device and can begin the capture of the person's facial data via a video feed from the webcam or other camera. The video data that is collected can include one or more persons experiencing an event. The one or more persons can be sharing a personal electronic device or can each be using one or more devices for video capture. The videos that are collected can be collected using a web-based framework. The web-based framework can be used to display the video media presentation or event as well as to collect videos from multiple viewers who are online. That is, the collection of videos can be crowdsourced from those viewers who elected to opt-in to the video data collection.

The videos captured from the various viewers who chose to opt-in can be substantially different in terms of video quality, frame rate, etc. As a result, the facial video data can be scaled, rotated, and otherwise adjusted to improve consistency. Human factors further influence the capture of the facial video data. The facial data that is captured might or might not be relevant to the video media presentation being displayed. For example, the viewer might not be paying attention, might be fidgeting, might be distracted by an object or event near the viewer, or be otherwise inattentive to the video media presentation. The behavior exhibited by the viewer can prove challenging to analyze due to viewer actions including eating, speaking to another person or persons, speaking on the phone, etc. The videos collected from the viewers might also include other artifacts that pose challenges during the analysis of the video data. The artifacts can include items such as eyeglasses (because of reflections), eye patches, jewelry, and clothing that occludes or obscures the viewer's face. Similarly, a viewer's hair or hair covering can present artifacts by obscuring the viewer's eyes and/or face.

The captured facial data can be analyzed using the "facial action coding system" (FACS). The FACS seeks to define groups or taxonomies of facial movements of the human face. The FACS encodes movements of individual muscles of the face, where the muscle movements often include slight, instantaneous changes in facial appearance. The FACS encoding is commonly performed by trained observers but can also be performed on automated, computer-based systems. Analysis of the FACS encoding can be used to determine emotions of the persons whose facial data is captured in the videos. The FACS is used to encode a wide range of facial expressions that are anatomically possible for the human face. The FACS encodings include action units (AUs) and related temporal segments that are based on the captured facial expression. The AUs are open to higher order interpretation and decision-making. These AUs can be used to recognize emotions experienced by the observed person. Emotion-related facial actions can be identified using both the "emotional facial action coding system" (EMFACS) and the "facial action coding system affect interpretation dictionary" (FACSAID). For a given emotion, specific action units can be related to the emotion. For example, the emotion of anger can be related to AUs 4, 5, 7, and 23, while happiness can be related to AUs 6 and 12. Other mappings of emotions to AUs have also been previously associated. The coding of the AUs can include an intensity scoring that ranges from A (trace) to E (maximum). The AUs can be used for analyzing images to identify patterns indicative of a particular mental and/or emotional state. The AUs range in number from 0 (neutral face) to 98 (fast up-down look). The AUs include so-called main codes (inner brow raiser, lid tightener, etc.), head movement codes (head turn left, head up, etc.), eye movement codes (eyes turned left, eyes up, etc.), visibility codes (eyes not visible, entire face not visible, etc.), and gross behavior codes (sniff, swallow, etc.). Emotion scoring can be included where intensity is evaluated, as well as for indicating specific emotions, moods, or mental states.

The coding of faces identified in videos captured of people observing an event can be automated. The automated systems can detect facial AUs or discrete emotional states. The emotional states can include amusement, fear, anger, disgust, surprise, and sadness. The automated systems can be based on a probability estimate from one or more classifiers, where the probabilities can correlate with an intensity of an AU or an expression. The classifiers can be used to identify into which of a set of categories a given observation can be placed. In some cases, the classifiers can be used to determine a probability that a given AU or expression is present in a given frame of a video. The classifiers can be used as part of a supervised machine learning technique, where the machine learning technique can be trained using "known good" data. Once trained, the machine learning technique can proceed to classify new data that is captured.

The supervised machine learning models can be based on support vector machines (SVMs). An SVM can have an associated learning model that is used for data analysis and pattern analysis. For example, an SVM can be used to classify data that can be obtained from collected videos of people experiencing a media presentation. An SVM can be trained using "known good" data that is labeled as belonging to one of two categories (e.g. smile and no-smile). The SVM can build a model that assigns new data into one of the two categories. The SVM can construct one or more hyperplanes that can be used for classification. The hyperplane that has the largest distance from the nearest training point can be determined to have the best separation. The largest separation can improve the classification technique by increasing the probability that a given data point can be properly classified.

In another example, a histogram of oriented gradients (HoG) can be computed. The HoG can include feature descriptors and can be computed for one or more facial regions of interest. The regions of interest of the face can be located using facial landmark points, where the facial landmark points can include outer edges of nostrils, outer edges of the mouth, outer edges of eyes, etc. A HoG for a given region of interest can count occurrences of gradient orientation within a given section of a frame from a video, for example. The gradients can be intensity gradients and can be used to describe an appearance and a shape of a local object. The HoG descriptors can be determined by dividing an image into small, connected regions, also called cells. A histogram of gradient directions or edge orientations can be computed for pixels in the cell. Histograms can be contrast-normalized based on intensity across a portion of the image or the entire image, thus reducing any influence from differences in illumination or changes in shadowing between and among video frames. The HoG can be computed on the image or on an adjusted version of the image, where the adjustment of the image can include scaling, rotation, etc. The image can be adjusted by flipping the image around a vertical line through the middle of a face in the image. The symmetry plane of the image can be determined from the tracker points and landmarks of the image.

In embodiments, an automated facial analysis system identifies five facial actions or action combinations in order to detect spontaneous facial expressions for media research purposes. Based on the facial expressions that are detected, a determination can be made with regard to the effectiveness of a given video media presentation, for example. The system can detect the presence of the AUs or the combination of AUs in videos collected from a plurality of people. The facial analysis technique can be trained using a web-based framework to crowdsource videos of people as they watch online video content. The video can be streamed at a fixed frame rate to a server. Human labelers can code for the presence or absence of facial actions including a symmetric smile, unilateral smile, asymmetric smile, and so on. The trained system can then be used to automatically code the facial data collected from a plurality of viewers experiencing video presentations (e.g. television programs).

Spontaneous asymmetric smiles can be detected in order to understand viewer experiences. Related literature indicates that for spontaneous expressions, as many asymmetric smiles occur on the right hemi face as do on the left hemi face. Detection can be treated as a binary classification problem, where images that contain a right asymmetric expression are used as positive (target class) samples, and all other images are used as negative (non-target class) samples. Classifiers perform the classification, including classifiers such as support vector machines (SVM) and random forests. Random forests can include ensemble-learning methods that use multiple learning algorithms to obtain better predictive performance. Frame-by-frame detection can be performed to recognize the presence of an asymmetric expression in each frame of a video. Facial points can be detected, including the top of the mouth and the two outer eye corners. The face can be extracted, cropped, and warped into a pixel image of specific dimension (e.g. 96×96 pixels). In embodiments, the inter-ocular distance and vertical scale in the pixel image are fixed. Feature extraction can be performed using computer vision software such as OpenCV™. Feature extraction can be based on the use of HoGs. HoGs can include feature descriptors and can be used to count occurrences of gradient orientation in localized portions or regions of the image. Other techniques can be used for counting occurrences of gradient orientation, including edge orientation histograms, scale-invariant feature transformation descriptors, etc. The AU recognition tasks can also be performed using Local Binary Patterns (LBP) and Local Gabor Binary Patterns (LGBP). The HoG descriptor represents the face as a distribution of intensity gradients and edge directions and is robust in its ability to translate and scale. Differing patterns, including groupings of cells of various sizes and arranged in variously sized cell blocks, can be used. For example, 4×4 cell blocks of 8×8 pixel cells with an overlap of half of the block can be used. Histograms of channels can be used, including nine channels or bins evenly spread over 0-180 degrees. In this example, the HoG descriptor on a 96×96 image is 25 blocks×16 cells×9 bins=3600, the latter quantity representing the dimension. AU occurrences can be rendered. The videos can be grouped into demographic datasets based on nationality and/or other demographic parameters for further detailed analysis. This grouping and other analyses can be facilitated via semiconductor-based logic.

Figure 8:
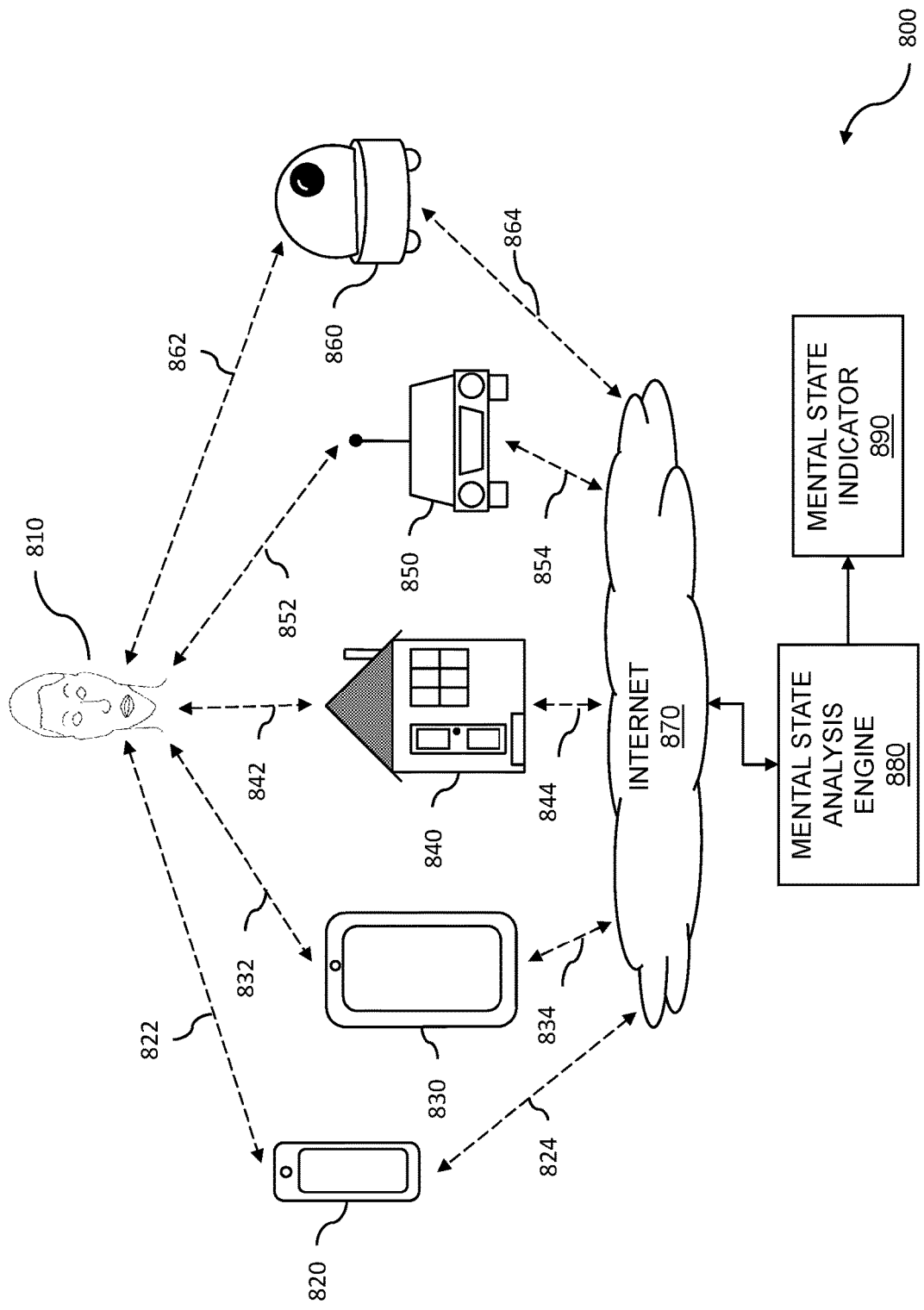
FIG. 8 illustrates data collection including devices and locations.

FIG. 8 illustrates data collection including devices and locations. Audio data and video data can be collected, using electronic devices and based on locations, for multimodal machine learning. A plurality of information channels is captured into a computing device. The plurality of information channels includes contemporaneous audio information and video information from an individual. Trained weights are learned on a multilayered convolutional computing system. The trained weights are learned using the audio information and the video information from the plurality of information channels, where the trained weights cover both the audio information and the video information and are trained simultaneously, and where the learning facilitates emotional analysis of the audio information and the video information. Further information is captured into a second computing device. The further information is analyzed using the trained weights to provide an emotion metric based on the further information.

In the diagram 800, the multiple mobile devices, vehicles, and locations can be used singly or together to collect one or more of video data and audio data on a user 810. While one person is shown, the video data and audio data can be collected on multiple people. A user 810 can be observed as she or he is performing a task, experiencing an event, viewing a media presentation, and so on. The user 810 can be shown one or more media presentations, political presentations, social media, or another form of displayed media. The one or more media presentations can be shown to a plurality of people. The media presentations can be displayed on an electronic display coupled to a client device. The data collected on the user 810 or on a plurality of users can be in the form of one or more videos, video frames, still images, audio files, audio clips, etc. The plurality of videos can be of people who are experiencing different situations. Some example situations can include the user or plurality of users being exposed to TV programs, movies, video clips, social media, social sharing, and other such media. The situations could also include exposure to media such as advertisements, political messages, news programs, and so on. As noted before, video data and audio data can be collected on one or more users in substantially identical or different situations and viewing either a single media presentation or a plurality of presentations. The data collected on the user 810 can be analyzed and viewed for a variety of purposes including expression analysis, mental state analysis, and so on. The electronic display can be on a smartphone 820 as shown, a tablet computer 830, a personal digital assistant, a television, a mobile monitor, or any other type of electronic device. In one embodiment, expression data is collected on a mobile device such as a cell phone 820, a tablet computer 830, a laptop computer, or a watch. Thus, the multiple sources can include at least one mobile device, such as a phone 820 or a tablet 830, or a wearable device such as a watch or glasses (not shown). A mobile device can include a front-side camera and/or a back-side camera that can be used to collect expression data. Sources of expression data can include a webcam, a phone camera, a tablet camera, a wearable camera, and a mobile camera. A wearable camera can comprise various camera devices, such as a watch camera. In addition to using client devices for data collection from the user 810, data can be collected in a house 840 using a web camera or the like; in a vehicle 850 using a web camera, client device, etc.; by a social robot 860, and so on.

As the user 810 is monitored, the user 810 might move due to the nature of the task, boredom, discomfort, distractions, or for another reason. As the user moves, the camera with a view of the user's face can be changed. Thus, as an example, if the user 810 is looking in a first direction, the line of sight 822 from the smartphone 820 is able to observe the user's face, but if the user is looking in a second direction, the line of sight 832 from the tablet 830 is able to observe the user's face. Furthermore, in other embodiments, if the user is looking in a third direction, the line of sight 842 from a camera in the house 840 is able to observe the user's face, and if the user is looking in a fourth direction, the line of sight 852 from the camera in the vehicle 850 is able to observe the user's face. If the user is looking in a fifth direction, the line of sight 862 from the social robot 860 is able to observe the user's face. If the user is looking in a sixth direction, a line of sight from a wearable watch-type device, with a camera included on the device, is able to observe the user's face. In other embodiments, the wearable device is another device, such as an earpiece with a camera, a helmet or hat with a camera, a clip-on camera attached to clothing, or any other type of wearable device with a camera or other sensor for collecting expression data. Similar to collecting video data, audio data can be collected by one or more devices. The audio data can be collected using a microphone, transducer, or other audio capture device coupled to the devices and the locations. The user 810 can also use a wearable device including a camera for gathering contextual information and/or collecting expression data on other users. Because the user 810 can move her or his head, the facial data can be collected intermittently when she or he is looking in a direction of a camera. In some cases, multiple people can be included in the view from one or more cameras, and some embodiments include filtering out faces of one or more other people to determine whether the user 810 is looking toward a camera. All or some of the expression data can be continuously or sporadically available from the various devices and other devices.

The captured video data can include facial expressions and can be transferred over the Internet 870. The captured audio data can include voice expression and can be transferred over the Internet 870. The smartphone 820 can share video and audio using link 824, the tablet 830 using link 834, the house 840 using link 844, the vehicle 850 using link 854, and the social robot 860 using link 864. The links 824, 834, 844, 854, and 864 can be wired, wireless, and hybrid links. The captured video data, including facial expressions, can be analyzed on a mental state analysis engine 880, on a computing device such as the video capture device, or on another separate device. The analysis could take place on one of the mobile devices discussed above, on a local server, on a remote server, and so on. In embodiments, some of the analysis takes place on the mobile device, while other analysis takes place on a server device. The analysis of the video data can include the use of a classifier. The video data can be captured using one of the mobile devices discussed above and sent to a server or another computing device for analysis. However, the captured video data including expressions can also be analyzed on the device which performed the capturing. The analysis can be performed on a mobile device where the videos were obtained with the mobile device and wherein the mobile device includes one or more of a laptop computer, a tablet, a PDA, a smartphone, a wearable device, and so on. In another embodiment, the analyzing comprises using a classifier on a server or computing device other than the capture device. The analysis data from the mental state analysis engine can be processed by a mental state indicator 890. The mental state indicator 890 can indicate mental states, moods, emotions, etc. In embodiments, the emotions can include of one or more of sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, curiosity, humor, sadness, poignancy, or mirth.

Figure 9:
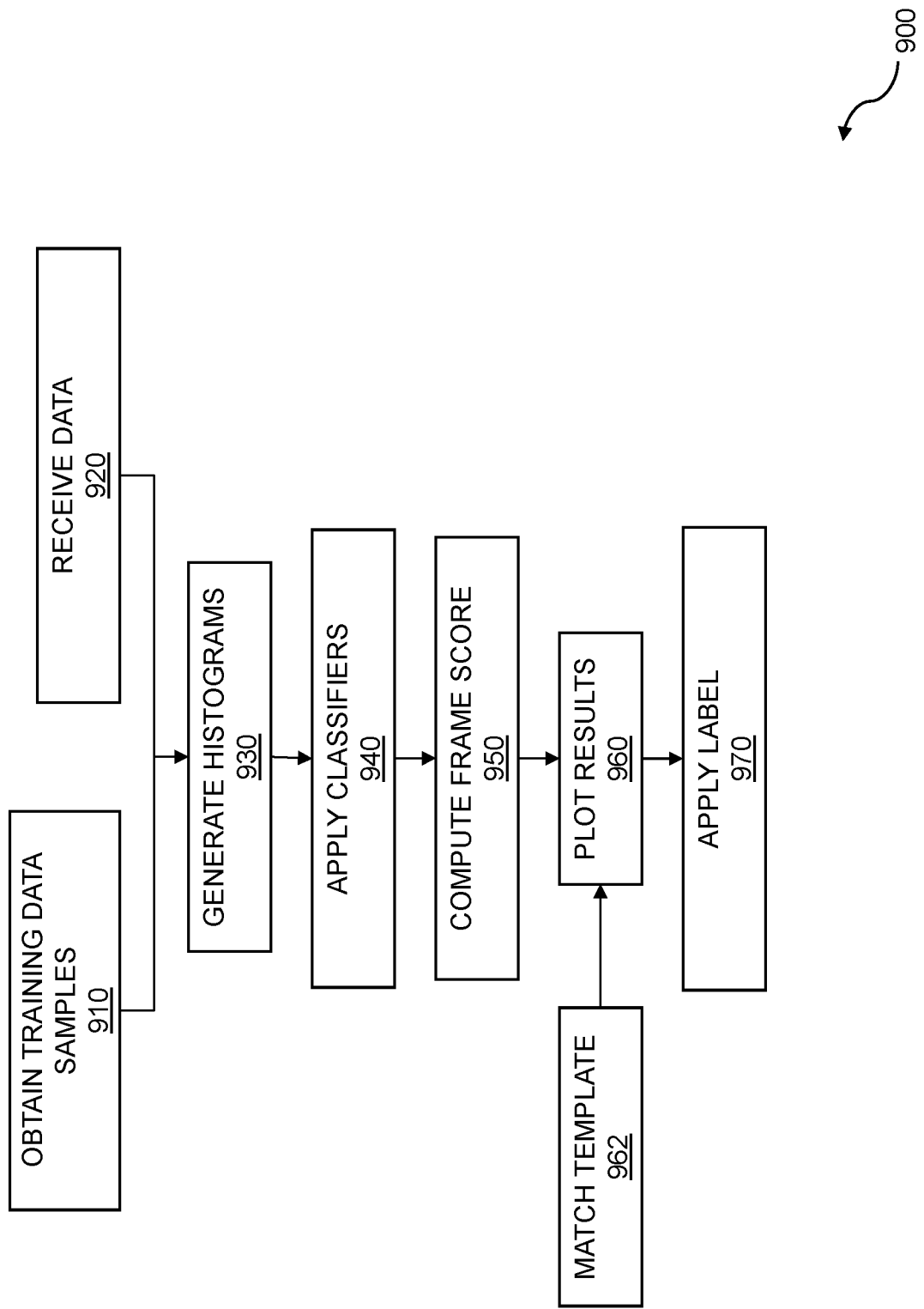
FIG. 9 is a flow diagram for detecting expressions.

FIG. 9 is a flow diagram for detecting expressions. Multimodal machine learning can be based on machine-trained analysis. The machine-trained analysis can be based on detecting expressions. A plurality of information channels is captured into a computing device such as a smartphone, personal digital assistant (PDA), tablet, laptop computer, and so on. The plurality of information channels includes contemporaneous audio information and video information from an individual. Trained weights are learned on a multilayered convolutional computing system. The trained weights are learned using the audio information and the video information from the plurality of information channels. The trained weights cover both the audio information and the video information and are trained simultaneously. The learning facilitates emotional analysis of the audio information and the video information. Further information is captured into a second computing device. The second computing device and the first computing device may be the same computing device. The further information can include physiological information, contextual information, and so on. The further information is analyzed using the trained weights to provide an emotion metric based on the further information.

Image analysis can include detection of facial expressions and can be performed for emotional metric generation. Audio analysis can include detection of audio expressions. The audio analysis can be performed in addition to or in place of the video analysis for emotional metric generation. The facial expressions of people can be detected as they interact with the Internet. Image data, including facial images, is collected from a user interacting with a media presentation. Processors are used to analyze the image data and the media presentation to extract emotional content.

Emotional intensity metrics are determined and retained in a storage component. The emotional intensity metrics are coalesced into a summary intensity metric, and the summary intensity metric is displayed on a screen. The flow 900, or portions thereof, can be implemented in semiconductor logic, can be accomplished using a mobile device, can be accomplished using a server device, and so on. The flow 900 can be used to automatically detect a wide range of facial expressions. A facial expression can produce strong emotional signals that can indicate valence and discrete emotional states. The discrete emotional states can include contempt, doubt, defiance, happiness, fear, anxiety, and so on. The detection of facial expressions can be based on the location of facial landmarks. The detection of facial expressions can be based on determination of action units (AU), where the action units are determined using FACS coding. The AUs can be used singly or in combination to identify facial expressions. Based on the facial landmarks, one or more AUs can be identified by number and intensity. For example, AU12 can be used to code a lip corner puller and can be used to infer a smirk.

The flow 900 includes obtaining training data samples 910. The data samples can include a plurality of images and audio of one or more people. Human coders who are trained to correctly identify AU codes based on the FACS can code the images. The training or "known good" images can be used as a basis for training a machine learning technique. Once trained, the machine learning technique can be used to identify AUs in other images that can be collected using a camera, a sensor, and so on. The flow 900 continues with receiving data 920. The data, which can include video data, can be received from a camera, a sensor, and so on. As previously discussed, the camera or cameras can include a webcam, where a webcam can include a video camera, a still camera, a thermal imager, a CCD device, a phone camera, a three-dimensional camera, a depth camera, a light field camera, multiple webcams used to show different views of a person, or any other type of image capture apparatus that can allow captured data to be used in an electronic system. The data can include audio data and can be received from a microphone, transducer, or other audio capture technique. The image that is received can be manipulated in order to improve the processing of the image. For example, the image can be cropped, scaled, stretched, rotated, flipped, etc. in order to obtain a resulting image that can be analyzed more efficiently. Multiple versions of the same image can be analyzed. In some cases, the manipulated image and a flipped or mirrored version of the manipulated image can be analyzed alone and/or in combination to improve analysis. The flow 900 continues with generating histograms 930 for the training images and the one or more versions of the received image. The histograms can be based on a HoG or another histogram. As described in previous paragraphs, the HoG can include feature descriptors and can be computed for one or more regions of interest in the training images and the one or more received images. The regions of interest in the images can be located using facial landmark points, where the facial landmark points can include outer edges of nostrils, outer edges of the mouth, outer edges of eyes, etc. A HoG for a given region of interest can count occurrences of gradient orientation within a given section of a frame from a video.

The flow 900 continues with applying classifiers 940 to the histograms. The classifiers can be used to estimate probabilities, where the probabilities can correlate with an intensity of an AU or an expression. In some embodiments, the choice of classifiers used is based on the training of a supervised learning technique to identify facial expressions. The classifiers can be used to identify into which of a set of categories a given observation can be placed. The classifiers can be used to determine a probability that a given AU or expression is present in a given image or frame of a video. In various embodiments, the one or more AUs that are present include AU01 inner brow raiser, AU12 lip corner puller, AU38 nostril dilator, and so on. In practice, the presence or absence of multiple AUs can be determined. The flow 900 continues with computing a frame score 950. The score computed for an image, where the image can be a frame from a video, can be used to determine the presence of a facial expression in the image or video frame. The score can be based on one or more versions of the image or a manipulated image. The score can be based on a comparison of the manipulated image to a flipped or mirrored version of the manipulated image. The score can be used to predict a likelihood that one or more facial expressions are present in the image. The likelihood can be based on computing a difference between the outputs of a classifier used on the manipulated image and on the flipped or mirrored image, for example. The classifier that is implemented can be used to identify symmetrical facial expressions (e.g. smile), asymmetrical facial expressions (e.g. outer brow raiser), and so on.

The flow 900 continues with plotting results 960. The results that are plotted can include one or more scores for one or more frames computed over a given time t. For example, the plotted results can include classifier probability results from analysis of HoGs for a sequence of images and video frames. The plotted results can be matched with a template 962. The template can be temporal and can be represented by a centered box function or another function. A best fit with one or more templates can be found by computing a minimum error. Other best-fit techniques can include polynomial curve fitting, geometric curve fitting, and so on. The flow 900 continues with applying a label 970. The label can be used to indicate that a particular facial expression has been detected in the one or more images or video frames which constitute the image data that was received 920. The label can be used to indicate that any of a range of facial expressions has been detected, including a smile, an asymmetric smile, a frown, and so on. Various steps in the flow 900 may be changed in order, repeated, omitted, or the like without departing from the disclosed concepts. Various embodiments of the flow 900 can be included in a computer program product embodied in a non-transitory computer readable medium that includes code executable by one or more processors. Various embodiments of the flow 900, or portions thereof, can be included on a semiconductor chip and implemented in special purpose logic, programmable logic, and so on.

Figure 10:
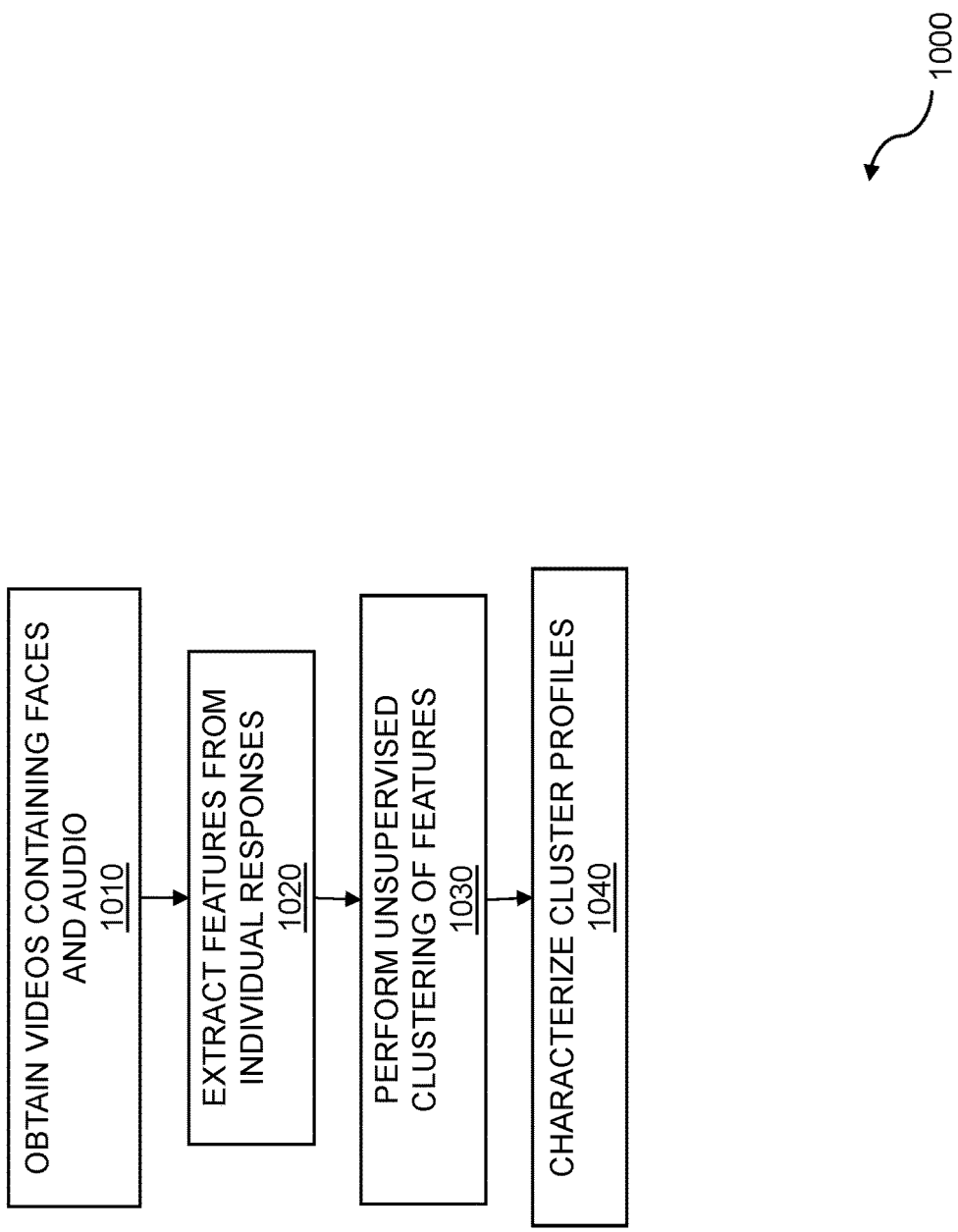
FIG. 10 is a flow diagram for the large-scale clustering of events.

FIG. 10 is a flow diagram for the large-scale clustering of events. Large-scale clustering of events such as video events and audio events can be used for machine-trained analysis related to multimodal machine learning. A plurality of information channels is captured into a computing device. The plurality of information channels includes contemporaneous audio information and video information from an individual. Trained weights are learned on a multilayered convolutional computing system. The trained weights are learned using the audio information and the video information from the plurality of information channels, where the trained weights cover both the audio information and the video information and are trained simultaneously, and where the learning facilitates emotional analysis of the audio information and the video information. Further information is captured into a second computing device. The further information is analyzed using the trained weights to provide an emotion metric based on the further information.

The large-scale clustering of events can be performed for video data and audio data collected from a remote computing device. The events can be collected from people as they interact with the Internet. The clustering and evaluation of events can be augmented using a mobile device, a server, semiconductor-based logic, and so on. As discussed above, collection of audio data and facial video data from one or more people can include a web-based framework. The web-based framework can be used to collect audio data and facial video data from large numbers of people located over a wide geographic area. The web-based framework can include an opt-in feature that allows people to agree to the collection of audio and facial data. The web-based framework can be used to render and display data to one or more people and can collect data from the one or more people. For example, the data collection can be based on showing one or more viewers a video media presentation through a website. The web-based framework can be used to display the video media presentation or event and to collect video data and audio data from multiple people who are online. That is, the collection of video data and audio data can be crowdsourced from those viewers who elected to opt-in to the video and audio data collection. The event can be a commercial, a political ad, an educational segment, and so on.

The flow 1000 includes obtaining videos containing faces and audio 1010. The videos can be obtained using one or more cameras, where the cameras can include a webcam coupled to one or more devices employed by the one or more people using the web-based framework. The audio can be obtained using one or more microphones, transducers, or other audio capturing devices. The flow 1000 continues with extracting features from the individual responses 1020. The individual responses can include videos containing faces observed by the one or more webcams and audio captured by the one or more microphones. The features that are extracted can include facial features such as an eyebrow, a nostril, an eye edge, a mouth edge, and so on. The features that are extracted can comprise voice features including timbre, prosody, vocal register, vocal resonance, pitch, loudness, speech rate, and language content. The feature extraction can be based on facial coding classifiers, where the facial coding classifiers output a probability that a specified facial action has been detected in a given video frame. The flow 1000 continues with performing unsupervised clustering of features 1030. The unsupervised clustering can be based on an event. The unsupervised clustering can be based on a K-Means, where the K of the K-Means can be computed using a Bayesian Information Criterion (BICk), for example, to determine the smallest value of K that meets system requirements. Any other criterion for K can be used. The K-Means clustering technique can be used to group one or more events into various respective categories.

The flow 1000 includes characterizing cluster profiles 1040. The profiles can include a variety of facial expressions such as smiles, asymmetric smiles, the raising or lowering of eyebrows, etc. The profiles can be related to a given event. For example, a humorous video can be displayed in the web-based framework and the video data of people who have opted-in can be collected. The characterization of the collected and analyzed video can depend in part on the number of smiles that occurred at various points throughout the humorous video. Similarly, the characterization can be performed on collected and analyzed videos of people viewing a news presentation. The characterized cluster profiles can be further analyzed based on demographic data. The number of smiles resulting from people viewing a humorous video can be compared across various demographic groups, where the groups can be formed based on geographic location, age, ethnicity, gender, and so on.

The flow 1000 can include determining mental state event temporal signatures. The mental state event temporal signatures can include information on rise time to facial expression intensity, fall time from facial expression intensity, duration of a facial expression, and so on. In some embodiments, the mental state event temporal signatures are associated with certain demographics, ethnicities, cultures, etc. The mental state event temporal signatures can be used to identify one or more of sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, curiosity, humor, depression, envy, sympathy, embarrassment, poignancy, or mirth. Various steps in the flow 1000 may be changed in order, repeated, omitted, or the like without departing from the disclosed concepts. Various embodiments of the flow 1000 can be included in a computer program product embodied in a non-transitory computer readable medium that includes code executable by one or more processors. Various embodiments of the flow 1000, or portions thereof, can be included on a semiconductor chip and implemented in special purpose logic, programmable logic, and so on.

Figure 11:
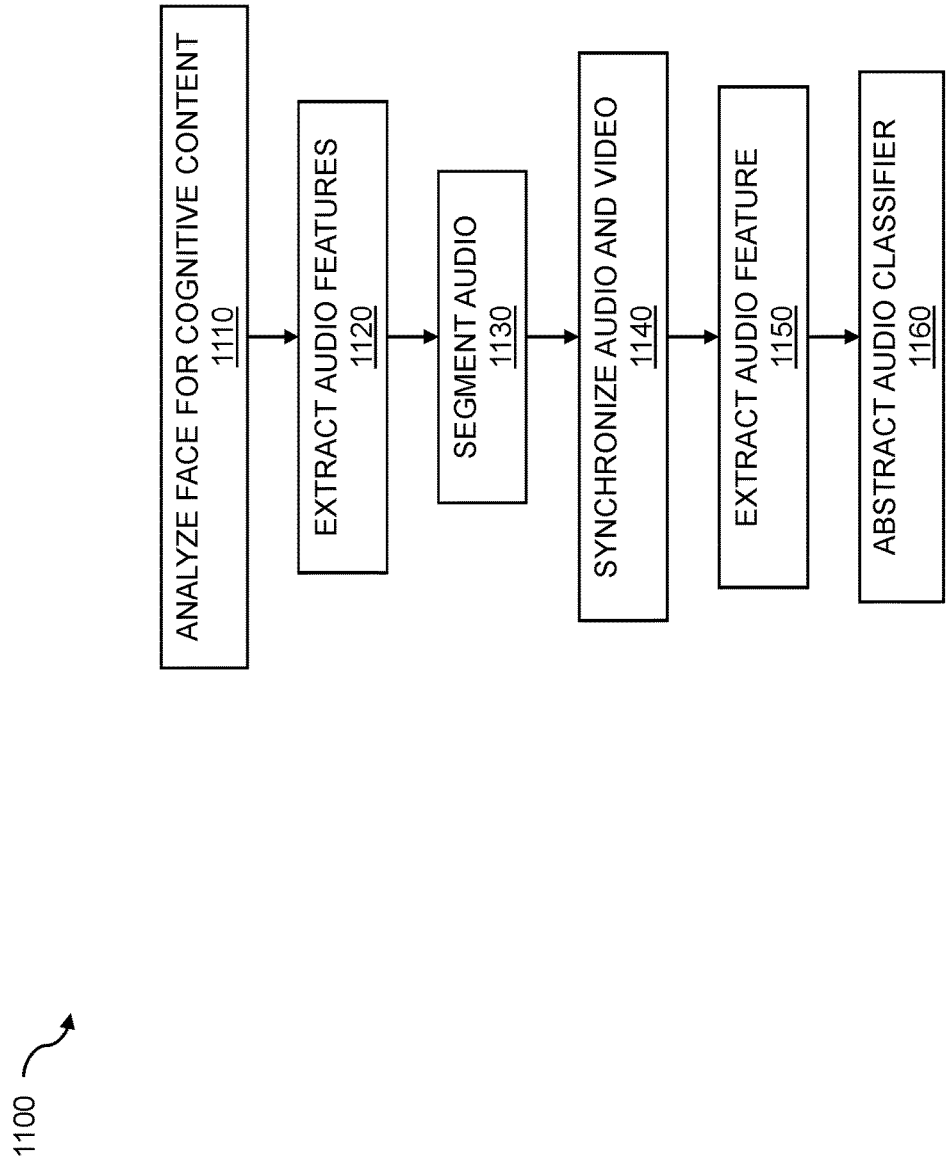
FIG. 11 is a flow diagram for audio cognitive content analysis.

FIG. 11 is a flow diagram for audio cognitive content analysis. The audio cognitive content analysis can be used for audio analysis learning using video data. Video data is obtained, where the video data includes images of one or more people. Audio data which corresponds to the video data is obtained. A face is identified within the video data, and a first voice from the audio data is associated with the face. The face is analyzed for cognitive content. An audio classifier is learned based on the analyzing, and the audio classifier is used for further analyzing audio data. The flow 1100 includes analyzing a face within the video data for cognitive content 1110. The analyzing can be based on classifiers. The analyzing can include other content such as emotional content, mental state content, and so on. The flow 1100 includes extracting audio features 1120. The one or more audio features can be associated with analyzed face cognitive content. The audio features 1120 can be extracted from a voice, where the voice can be associated with a face within video data. The audio features can be extracted based on analysis. The analyzing the first voice for features can include evaluation of timbre. Timbre can include tonal color, tonal quality, etc. The analyzing the first voice for features can include evaluation of prosody. Prosody can include rhythm and sound, stress and intonation, and the like. The analyzing the first voice for features can include analysis of vocal register and resonance, pitch, speech loudness, or speech rate. Other analysis tasks can be performed. In embodiments, the analyzing the first voice for features can include language analysis. The analyzing the first voice can be based on language content. The analyzing can be based on Romance languages, Asian languages, indigenous languages, and so on.

The flow 1100 includes segmenting the audio data 1130 to correspond to an analyzed cognitive state. The audio can be segmented based on the occurrence of an event, a timestamp, an elapsed period of time, and so on. In embodiments, the segmenting the audio data can be for a human sensorially detectable unit of time. A human sensorially detectable unit of time can be based on an absolute threshold that can be detected 50 percent of the time or more. The segmenting the audio data can include noticeable differences in intensity, duration, or pitch, of a sound, a tone, a voice, and the like. In embodiments, the segmenting the audio data can be for less than thirty seconds. The flow 1100 includes synchronizing audio data with video data 1140. The audio can include a voice, a tone, a sound, etc. The synchronizing can include synchrony between a face and the voice in expressing cognitive states, mental states, emotional states, moods, and so on. The synchronizing can be based on markers in the audio data and the video data. The markers can occur due to an event such as a person speaking, a car horn, a sneeze, laughter, and so on. The synchronizing can be based on finding an alignment between the voice and the face with autonomous training techniques.

The flow 1100 includes extracting an audio feature 1150 associated with the analyzed face cognitive content. The audio feature can be one or more of evaluation of timbre and prosody. Other audio features can be extracted. In embodiments, the audio feature can include analyzing the first voice for features including analysis of vocal register and resonance, pitch, speech volume, or speech rate. The audio feature can include language analysis, where language analysis can be dependent on language content. Further embodiments include extracting audio features corresponding to the cognitive content of the video data. The flow 1100 includes abstracting an audio classifier 1160 based on the extracted audio feature. A classifier can be abstracted to differentiate speech from other sounds, discern one voice from a second voice, and so on. The abstracted classifier can correspond to the cognitive content of the video data. Various steps in the flow 1100 may be changed in order, repeated, omitted, or the like without departing from the disclosed concepts. Various embodiments of the flow 1100 can be included in a computer program product embodied in a non-transitory computer readable medium that includes code executable by one or more processors.

Figure 12:
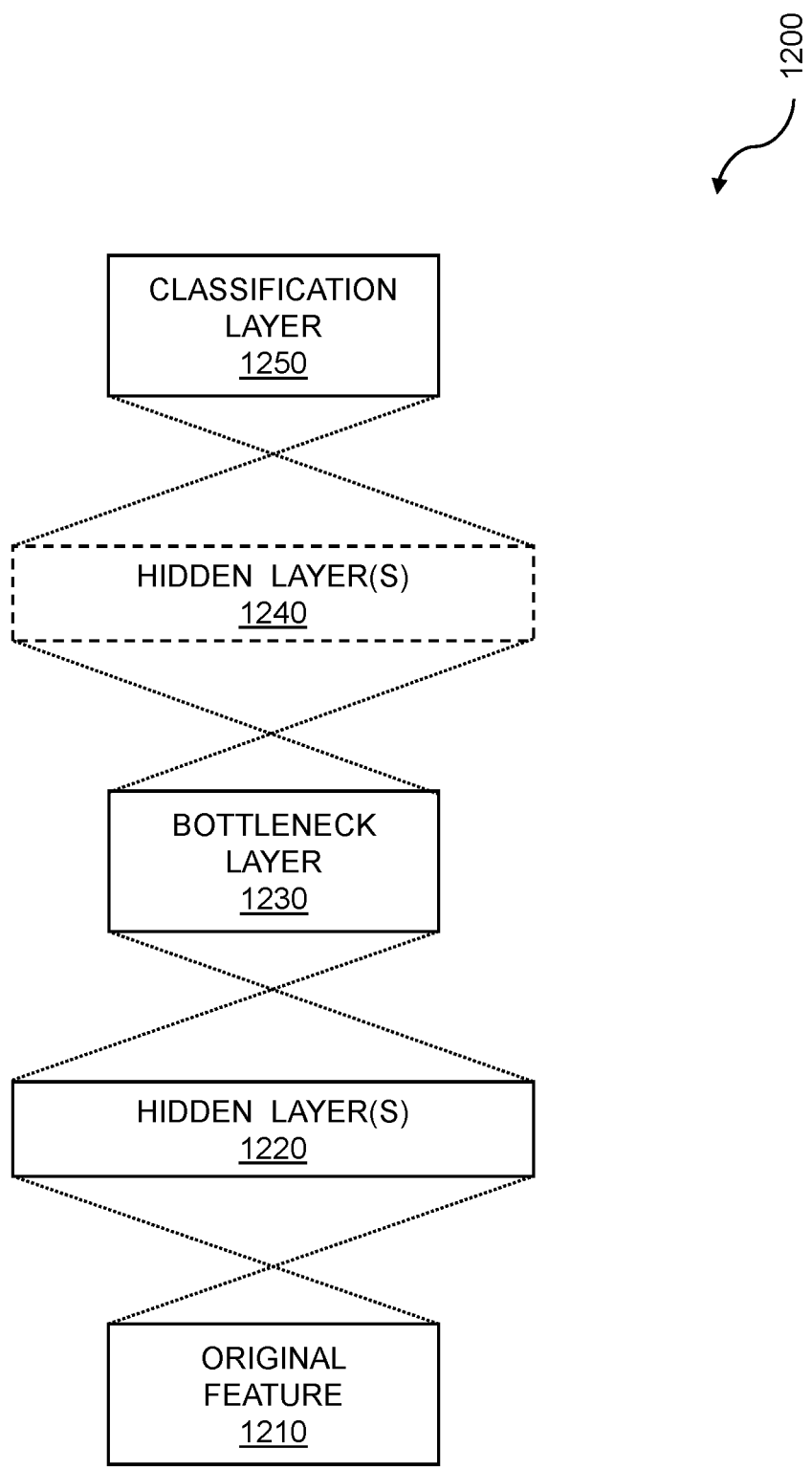
FIG. 12 illustrates a bottleneck layer within a deep learning environment.

FIG. 12 illustrates a bottleneck layer within a deep learning environment. A bottleneck layer can be a layer of a deep neural network, and can be used for audio analysis learning using video data. A deep neural network can apply audio classifiers. The audio classifiers are learned from analyzed facial data for a face within the video data. Video data is obtained that includes images of one or more people. Audio data that corresponds to the video data is obtained. A face is identified within the video data, and a voice from the audio data is associated with the face. Using the learned audio classifiers, further audio data is analyzed.

Layers of a deep neural network can include a bottleneck layer 1200. A bottleneck layer can be used for a variety of applications such as facial recognition, voice recognition, emotional state recognition, and so on. The deep neural network in which the bottleneck layer is located can include a plurality of layers. The plurality of layers can include an original feature layer 1210. A feature such as an image feature can include points, edges, objects, boundaries between and among regions, properties, and so on. The deep neural network can include one or more hidden layers 1220. The one or more hidden layers can include nodes, where the nodes can include nonlinear activation functions and other techniques. The bottleneck layer can be a layer that learns translation vectors to transform a neutral face to an emotional or expressive face. In some embodiments, the translation vectors can transform a neutral sounding voice to an emotional or expressive voice. Specifically, activations of the bottleneck layer determine how the transformation occurs. A single bottleneck layer can be trained to transform a neutral face or voice to an emotional or expressive face or voice. In some cases, individual bottleneck layers can be trained for a transformation pair. At runtime, once the user's emotion has been identified and an appropriate response to it can be determined (mirrored or complementary), the trained bottleneck layer can be used to perform the needed transformation.

The deep neural network can include a bottleneck layer 1230. The bottleneck layer can include a fewer number of nodes than the one or more preceding hidden layers. The bottleneck layer can create a constriction in the deep neural network or other network. The bottleneck layer can force information that is pertinent to a classification into a low dimensional representation. The bottleneck features can be extracted using an unsupervised technique. In other embodiments, the bottleneck features can be extracted in a supervised manner. The supervised technique can include training the deep neural network with a known dataset. The features can be extracted from an autoencoder such as a variational autoencoder, a generative autoencoder, and so on. The deep neural network can include hidden layers 1240. The count of the hidden layers can include zero hidden layers, one hidden layer, a plurality of hidden layers, and so on. The hidden layers following the bottleneck layer can include more nodes than the bottleneck layer. The deep neural network can include a classification layer 1250. The classification layer can be used to identify the points, edges, objects, boundaries, and so on, described above. The classification layer can be used to identify cognitive states, mental states, emotional states, moods, and the like. The output of the final classification layer can be indicative of the emotional states of faces within the images, where the images can be processed using the deep neural network.

Figure 13:
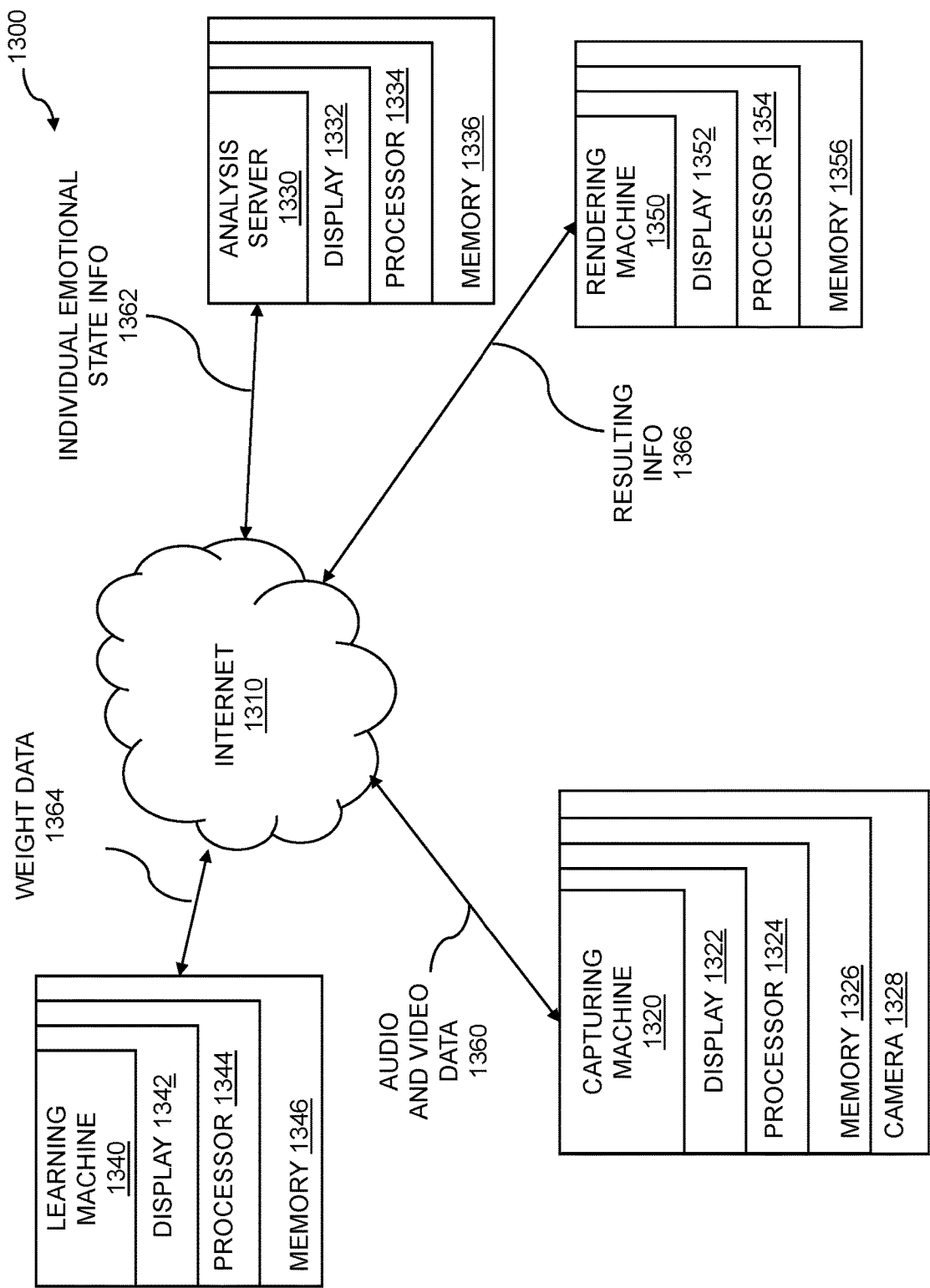
FIG. 13 is a diagram of a system for machine-trained analysis for multimodal machine learning.

FIG. 13 is a diagram of a system 1300 for machine-trained analysis for multimodal machine learning. Multimodal machine learning can be based on machine-trained analysis of a plurality of information channels. The information channels can include audio information, video information, and so on. A plurality of information channels is captured into a computing device such as a smartphone, personal digital assistant (PDA), tablet, laptop computer, and so on. The plurality of information channels includes contemporaneous audio information and video information from an individual. Trained weights are learned on a multilayered convolutional computing system. The trained weights are learned using the audio information and the video information from the plurality of information channels. The trained weights cover both the audio information and the video information and are trained simultaneously. The learning facilitates emotional analysis of the audio information and the video information. Further information is captured into a second computing device. The second computing device and the first computing device may be the same computing device. The further information can include physiological information, contextual information, and so on. The further information is analyzed using the trained weights to provide an emotion metric based on the further information.

The Internet 1310, intranet, or another wired, wireless, or hybrid computer network can be used for communication among the various machines that comprise a system for image analysis. A capturing machine 1320 has a memory 1326 which stores instructions and one or more processors 1324 attached to the memory 1326, wherein the one or more processors 1324 can execute instructions. The capturing machine 1320 can also have an internet connection to carry mental state, audio, and facial video data 1360, and a display 1322 that can present various renderings to a user. The capturing machine 1320 can collect mental state data including video data and audio data from a plurality of people as they interact with a rendering. The capturing machine 1320 can include a camera 1328. The camera 1328 can include a webcam, a video camera, a still camera, a thermal imager, a CCD device, a phone camera, a three-dimensional camera, a depth camera, a light field camera, multiple webcams used to show different views of a person, or any other type of image capture technique that can allow captured data to be used in an electronic system. In some embodiments, there are multiple capturing machines 1320 that each collect mental state data including image data, facial data, audio data, voice data, etc., from one person or a plurality of people as they interact with a rendering. The capturing machine 1320 can communicate with an analysis server 1330 and other machines over the internet 1310, some other computer network, or by another method suitable for communication between two computers. In some embodiments, the analysis server 1330 functionality is embodied in a client device, which can be the capturing machine 1320.

A learning machine 1340 can have an internet connection for emotional weight data 1364, a memory 1346 which stores instructions, and one or more processors 1344 attached to the memory 1346, wherein the one or more processors 1344 can execute instructions. The learning machine 1340 can learn trained weights using audio information and video information. The weight data can be determined for one or more individuals interacting with one or more capturing machines 1320. The learning machine 1340 can learn trained weights, retrained weights, etc. In some embodiments, the learning machine 1340 renders content on a display 1342. The display 1342 can be any electronic display, including but not limited to, a computer display, a laptop screen, a netbook screen, a tablet computer screen, a smartphone display, a mobile device display, a remote with a display, a television, a projector, or the like.

An analysis server 1330 can have an internet connection for individual emotional state information 1362, a memory 1336 which stores instructions, and one or more processors 1334 attached to the memory 1336, wherein the one or more processors 1334 can execute instructions. The analysis server 1330 can receive individual emotional state information 1362 collected from one or more people as they interact with a rendering from the capturing machine 1320 and can analyze, aggregate, etc., the mental state information on the plurality of people who interact with the rendering. In some embodiments, the analysis server 1330 also allows a user to view and evaluate the individual emotional state information that is associated with the rendering on a display 1332.

A rendering machine 1350 can have a memory 1356 which stores instructions, and one or more processors 1354 attached to the memory 1356, wherein the one or more processors 1354 can execute instructions. The rendering machine 1350 can use an Internet connection 1310, or another computer communication technique, to send and receive resulting information 1366. The rendering machine 1350 can receive audio and video data 1360, weight data 1364, individual emotional state information 1362, etc. The data and information can be rendered on a display 1352.

Thus the system 1300 can comprise a computer system for machine-trained analysis comprising: a memory which stores instructions; one or more processors attached to the memory wherein the one or more processors, when executing the instructions which are stored, are configured to: capture, into a computing device, a plurality of information channels, wherein the plurality of information channels includes contemporaneous audio information and video information from an individual; learn, on a multilayered convolutional network, trained weights using the audio information and the video information from the plurality of information channels, wherein the trained weights are trained from both the audio information and the video information and are trained simultaneously, and wherein the learning facilitates emotional analysis of the audio information and the video information; and capture, into a second computing device, further information and analyze the further information using the trained weights to provide an emotion metric based on the further information.

In embodiments, the system 1300 can include a computer program product embodied in a non-transitory computer readable medium for machine-trained analysis, the computer program product comprising code which causes one or more processors to perform operations of: capturing, into a computing device, a plurality of information channels, wherein the plurality of information channels includes contemporaneous audio information and video information from an individual; learning, on a multilayered convolutional computing system, trained weights using the audio information and the video information from the plurality of information channels, wherein the trained weights cover both the audio information and the video information and are trained simultaneously, and wherein the learning facilitates emotional analysis of the audio information and the video information; and capturing, into a second computing device, further information and analyzing the further information using the trained weights to provide an emotion metric based on the further information.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for machine-trained analysis comprising:

capturing, into a computing device, a plurality of information channels, wherein the plurality of information channels includes contemporaneous audio information and video information from an individual;

learning, on a multilayered convolutional network, trained weights using the audio information and the video information from the plurality of information channels, wherein the trained weights are trained from both the audio information and the video information and are trained simultaneously, and wherein the learning facilitates emotional analysis of the audio information and the video information;

learning image descriptors, as part of the multilayered convolutional network, for emotional content; and capturing, into a second computing device, further information and analyzing the further information using the trained weights to provide an emotion metric based on the further information.

2. The method of claim 1 further comprising collecting additional information with the plurality of information channels from a second individual and learning the trained weights factoring in the additional information.

3. The method of claim 1 wherein the further information includes only video data.

4. The method of claim 1 wherein the further information includes only audio data.

5. The method of claim 1 wherein the audio information and the video information comprise multimodal emotional information.

6. The method of claim 1 wherein the learning comprises early fusion combination of video data and audio data for the analyzing of the further information.

7. The method of claim 1 wherein the computing device and the second computing device are a same computing device.

8. The method of claim 1 wherein the learning comprises hybrid learning using early fusion combination of portions of the audio information and the video information along with late fusion combination of portions of the audio information and the video information.

9. The method of claim 1 wherein the capturing further information comprises intermittent information.

10. The method of claim 9 wherein during capturing further information, one channel from the plurality of information channels drops out, and the analyzing the further information continues without the one channel that dropped out.

11. The method of claim 1 further comprising tuning the multilayered convolutional network.

12. The method of claim 1 wherein the analyzing of the further information further comprises counting occurrences of a specific emotion type.

13. The method of claim 12 further comprising building a summary emotional intensity metric based on a number of the occurrences.

14. The method of claim 1 wherein the multilayered convolutional network includes multiple layers that include one or more convolutional layers and one or more hidden layers.

15. The method of claim 14 wherein a last layer within the multiple layers provides output indicative of emotional state.

16. The method of claim 15 further comprising tuning the last layer within the multiple layers for a particular emotional state.

17. The method of claim 14 wherein the learning comprises assigning weights to inputs on one or more layers within the multilayered convolutional network.

18. The method of claim 17 wherein the assigning weights is accomplished during a feed-forward pass through the multilayered convolutional network.

19. The method of claim 17 wherein the weights are updated during a backpropagation process through the multilayered convolutional network.

20. The method of claim 1 further comprising using iterative semi-supervised updates of model weights in the learning.

21. The method of claim 1 further comprising performing unsupervised learning as part of training the multilayered convolutional network.

22. The method of claim 1 further comprising training an emotion classifier, as part of the multilayered convolutional network, for emotional content.

23. A computer program product embodied in a non-transitory computer readable medium for machine-trained analysis, the computer program product comprising code which causes one or more processors to perform operations of:

capturing, into a computing device, a plurality of information channels, wherein the plurality of information channels includes contemporaneous audio information and video information from an individual;

learning, on a multilayered convolutional network, trained weights using the audio information and the video information from the plurality of information channels, wherein the trained weights are trained from both the audio information and the video information and are trained simultaneously, and wherein the learning facilitates emotional analysis of the audio information and the video information;

learning image descriptors, as part of the multilayered convolutional network, for emotional content; and capturing, into a second computing device, further information and analyzing the further information using the trained weights to provide an emotion metric based on the further information.

24. A computer system for machine trained analysis comprising:

a memory which stores instructions;

one or more processors attached to the memory wherein the one or more processors, when executing the instructions which are stored, are configured to:

capture, into a computing device, a plurality of information channels, wherein the plurality of information channels includes contemporaneous audio information and video information from an individual;

learn, on a multilayered convolutional network, trained weights using the audio information and the video information from the plurality of information channels, wherein the trained weights are trained from both the audio information and the video information and are trained simultaneously, and wherein the learning facilitates emotional analysis of the audio information and the video information;

learn image descriptors, as part of the multilayered convolutional network, for emotional content; and capture, into a second computing device, further information and analyze the further information using the trained weights to provide an emotion metric based on the further information.

* * * * *